United States Patent
Naka et al.

(10) Patent No.: US 11,425,773 B2
(45) Date of Patent: Aug. 23, 2022

(54) NON-TRANSITORY COMPUTER-READABLE RECORDING MEDIUM STORING COMPUTER-READABLE INSTRUCTIONS FOR TERMINAL DEVICE, TERMINAL DEVICE, AND COMMUNICATION DEVICE

(71) Applicant: Brother Kogyo Kabushiki Kaisha, Nagoya (JP)

(72) Inventors: Keishi Naka, Nagoya (JP); Hiroyuki Yamaoka, Nagoya (JP); Tatsuhiko Sone, Nagoya (JP); Naoki Kusumoto, Nagoya (JP)

(73) Assignee: Brother Kogyo Kabushiki Kaisha, Nagoya (JP)

( * ) Notice: Subject to any disclaimer, the term of this patent is extended or adjusted under 35 U.S.C. 154(b) by 476 days.

(21) Appl. No.: 16/460,343

(22) Filed: Jul. 2, 2019

(65) Prior Publication Data
US 2020/0015307 A1    Jan. 9, 2020

(30) Foreign Application Priority Data
Jul. 5, 2018   (JP) .............................. JP2018-128356

(51) Int. Cl.
*H04W 76/18* (2018.01)
*H04L 41/0686* (2022.01)
(Continued)

(52) U.S. Cl.
CPC ........... *H04W 76/18* (2018.02); *H04L 9/3226* (2013.01); *H04L 41/0668* (2013.01);
(Continued)

(58) Field of Classification Search
CPC ..... H04W 76/18; H04W 12/06; H04W 12/08; H04W 24/04; H04W 12/0471;
(Continued)

(56) References Cited

U.S. PATENT DOCUMENTS

2017/0005876 A1    1/2017 Shibata
2017/0123739 A1*   5/2017 Konji .................. H04W 60/005
(Continued)

FOREIGN PATENT DOCUMENTS

JP      2011-159095 A    8/2011
JP      2017-017601 A    1/2017
(Continued)

OTHER PUBLICATIONS

Wi-Fi Alliance Technical Committee P2P Task Group, "Wi-Fi Peer-to Peer (P2P) Technical Specification", Version 1.1, pp. 1-159, 2010.
Apr. 11, 2022—(JP) Notice of Reasons for Refusal—App 2018-128356.

*Primary Examiner* — Mohammad W Reza
(74) *Attorney, Agent, or Firm* — Banner & Witcoff, Ltd.

(57) ABSTRACT

A terminal device may acquire first connection information including a plurality of parameters, and send the first connection information to a communication device by using a first wireless connection and not via an access point. The first connection information is used in the communication device to execute a process for establishing a wireless connection with a target access point. The terminal device may receive a failure notification indicating that the process has failed from the communication device by using the first wireless connection and not via an access point in a case where the process in the communication device has failed, and display a cause screen indicating that the process has failed due to the specific parameter on a display unit in a case where the failure notification is received from the communication device.

16 Claims, 12 Drawing Sheets

(51) Int. Cl.
*H04W 24/04* (2009.01)
*H04L 9/32* (2006.01)
*H04W 12/06* (2021.01)
*H04W 12/08* (2021.01)
*H04L 9/40* (2022.01)
*H04L 41/0668* (2022.01)

(52) U.S. Cl.
CPC ........ *H04L 41/0686* (2013.01); *H04L 63/083* (2013.01); *H04W 12/06* (2013.01); *H04W 12/08* (2013.01); *H04W 24/04* (2013.01)

(58) Field of Classification Search
CPC ...... H04W 12/50; H04W 4/80; H04L 9/3226; H04L 41/0668; H04L 41/0686; H04L 63/083; H04L 43/0811
See application file for complete search history.

(56) References Cited

U.S. PATENT DOCUMENTS

| | | | |
|---|---|---|---|
| 2017/0127384 A1* | 5/2017 | Shimada | H04W 4/80 |
| 2017/0223748 A1 | 8/2017 | Sumiuchi et al. | |
| 2017/0265244 A1 | 9/2017 | Nogawa | |
| 2017/0280502 A1* | 9/2017 | Mihira | H04L 61/6081 |
| 2018/0132305 A1* | 5/2018 | Sumiuchi | H04W 76/10 |
| 2018/0192291 A1 | 7/2018 | Shibata | |
| 2019/0387500 A1 | 12/2019 | Shimada | |

FOREIGN PATENT DOCUMENTS

| | | |
|---|---|---|
| JP | 2017-085520 A | 5/2017 |
| JP | 2017-163483 A | 9/2017 |
| JP | 2017-188869 A | 10/2017 |

* cited by examiner

NON-TRANSITORY COMPUTER-READABLE RECORDING MEDIUM STORING COMPUTER-READABLE INSTRUCTIONS FOR TERMINAL DEVICE, TERMINAL DEVICE, AND COMMUNICATION DEVICE

CROSS-REFERENCE TO RELATED APPLICATION

This application claims priority to Japanese Patent Application No. 2018-128356, filed on Jul. 5, 2018, the entire contents of which are hereby incorporated by reference into the present application.

TECHNICAL FIELD

The disclosure herein discloses a technique for establishing a wireless connection between a communication device and an access point by using a terminal device.

BACKGROUND ART

A communication system comprising an information processing device, a communication device, and an access point is known. The information processing device uses wireless communication of a Bluetooth (registered trademark) scheme to acquire, from the communication device, a list of access points to which the communication device can be connected and displays the list. In a case of accepting selection of an access point from a user, the information processing device displays a password input screen. In a case of accepting input of a password from the user, the information processing device sends an SSID (abbreviation of Service Set Identifier) of the selected access point and the inputted password to the communication device by using the wireless communication of the Bluetooth scheme. As a result, the communication device executes a process for establishing a Wi-Fi connection with the access point by using the SSID and the password. In a case where the process fails, the communication device sends a notification indicating that the process has failed to the information processing device. In a case of receiving the notification from the communication device, the information processing device displays a screen for checking with the user whether to retry the process for establishing a Wi-Fi connection with the access point.

SUMMARY

Even when the user views the screen displayed on the information processing device, the user cannot recognize a cause of the failure in establishing a Wi-Fi connection between the communication device and the access point. Consequently, it may not be possible to appropriately establish a Wi-Fi connection between the communication device and the access point.

The disclosure herein discloses a technique capable of appropriately establishing a wireless connection between a communication device and a target access point by using a terminal device.

The disclosure herein discloses a non-transitory computer-readable recording medium storing computer-readable instructions for a terminal device. The computer-readable instructions, when executed by a processor of the terminal device, may cause the terminal device to acquire first connection information including a plurality of parameters for establishing a wireless connection with a target access point; after a first wireless connection with a communication device has been established via a wireless interface of the terminal device, send the first connection information to the communication device by using the first wireless connection and not via an access point, the first connection information being used in the communication device to execute a process for establishing a wireless connection with the target access point by using the plurality of parameters included in the first connection information; in a case where the process in the communication device has failed, receive a failure notification indicating that the process has failed from the communication device by using the first wireless connection and not via an access point, the failure notification including information indicating that the process has failed due to a specific parameter among the plurality of parameters; and in a case where the failure notification is received from the communication device, display a cause screen indicating that the process has failed due to the specific parameter on a display unit of the terminal device.

Further, the disclosure herein discloses a communication device. The communication device may comprise a wireless interface; a processor; and a memory storing computer-readable instructions therein, the computer-readable instructions, when executed by the processor, causing the communication device to: establish a first wireless connection with a terminal device via the wireless interface; after the first wireless connection has been established with the terminal device, receive first information from the terminal device by using the first wireless connection and not via an access point, the first connection information including a plurality of parameters for establishing a wireless connection with a target access point; in a case where the first connection information is received from the terminal device, execute a process for establishing a wireless connection with the target access point by using the plurality of parameters included in the first connection information; and in a case where the process has failed, send a failure notification indicating that the process has failed to the terminal device by using the first wireless connection and not via an access point, the failure notification including information indicating that the process has failed due to a specific parameter among the plurality of parameters, wherein a cause screen indicating that the process has failed due to the specific parameter is displayed on the terminal device in a case where the terminal device receives the failure notification.

The terminal device itself and a method implemented by the terminal device are also novel and useful. Further, a computer program for realizing the communication device, a computer-readable recording medium storing this computer program, and a method implemented by the communication device are also novel and useful. Further, a communication system comprising the above terminal device and the communication device is also novel and useful.

EMBODIMENTS

Figure 1:
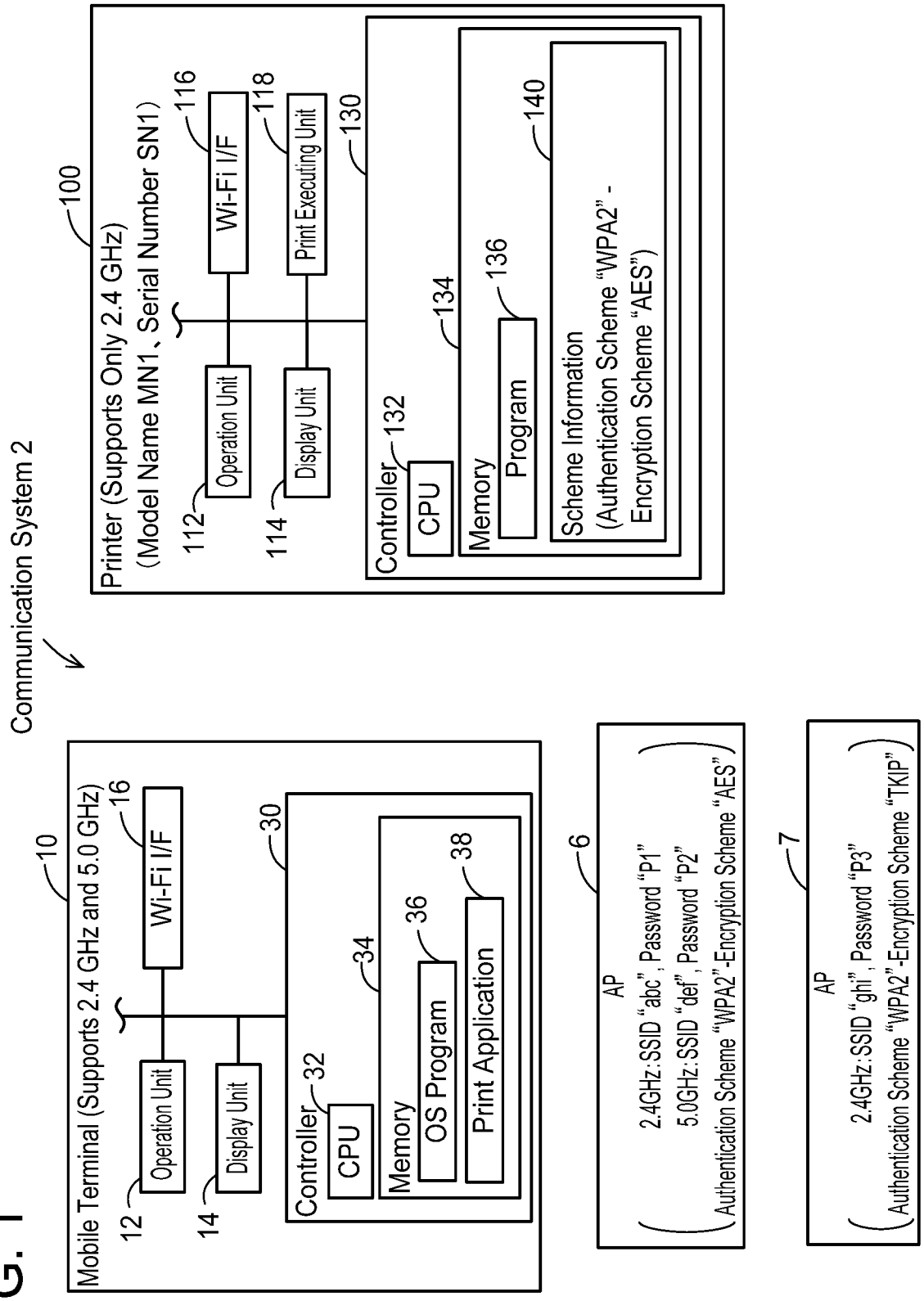
FIG. 1 shows a configuration of a communication system.

First Embodiment (Configuration of Communication System 2; FIG. 1)

A communication system 2 comprises a mobile terminal 10 and a printer 100. In the present embodiment, a situation is assumed in which a user uses the mobile terminal 10 to establish a wireless connection between the printer 100 and any one of a plurality of APs (abbreviation of Access Point) 6, 7.

(Configuration of Mobile Terminal 10)

The mobile terminal 10 is a portable terminal device such as a mobile phone, (e.g., a smartphone), a PDA, a notebook PC, a tablet PC, or the like. In a variant, the mobile terminal 10 may be a stationary terminal device (e.g., a desktop PC, etc.). The mobile terminal 10 comprises an operation unit 12, a display unit 14, a Wi-Fi interface 16, and a controller 30. Below, an interface will be denoted as "I/F".

The operation unit 12 is constituted of a plurality of keys. The user can input various instructions to the mobile terminal 10 by operating the operation unit 12. The display unit 14 is a display for displaying various types of information. The display unit 14 may function as an operation unit such as a touch panel, etc.

The Wi-Fi I/F 16 is a wireless interface for executing wireless communication according to a Wi-Fi scheme. The Wi-Fi scheme is a wireless communication scheme for executing wireless communication in accordance with, for example, IEEE (abbreviation of The Institute of Electrical and Electronics Engineers, Inc.) standard 802.11 and standards conforming thereto (e.g., 802.11a, 11b, 11g, 11n, etc.). The Wi-Fi I/F 16 especially supports a WFD scheme formulated by the Wi-Fi Alliance and is capable of executing wireless communication in accordance with the WFD scheme. The WFD scheme is a wireless communication scheme described in the standard document "Wi-Fi Peer-to-Peer (P2P) Technical Specification Version 1.1" created by the Wi-Fi Alliance. That is, the Wi-Fi I/F 16 is capable of establishing a wireless connection with an AP in accordance with the normal Wi-Fi scheme that is not the WFD scheme (called "AP connection" below) and is also capable of establishing a wireless connection with an external device (e.g., the printer 100), not via the AP, in accordance with the WFD scheme (called "WFD connection" below).

In wireless communication in accordance with the Wi-Fi scheme, radio waves (i.e., carrier waves), of which frequency band is either one of two types of 2.4 GHz and 5.0 GHz, are used. The Wi-Fi I/F 16 supports the two types of frequency bands (i.e., 2.4 GHz and 5.0 GHz). That is, the Wi-Fi I/F 16 is capable of executing wireless communication using 2.4 GHz radio waves and is also capable of executing wireless communication using 5.0 GHz radio waves.

The controller 30 comprises a CPU 32 and a memory 34. The CPU 32 is configured to execute various processes in accordance with an OS (abbreviation of Operating System) program (simplified as "OS" below) 36 stored in the memory 34. The memory 34 is constituted of a volatile memory, a non-volatile memory, and the like. Further, the memory 34 stores a print application (simplified as "app" below) 38. The app 38 realizes establishment of an AP connection between the printer 100 and an AP and also causes the printer 100 to execute printing. The app 38 may be installed to the mobile terminal 10 from a server on the Internet provided by a vendor of the printer 100, or may be installed to the mobile terminal 10 from media shipped together with the printer 100, for example.

(Configuration of Printer 100)

The printer 100 is a peripheral device (e.g., a peripheral device of the mobile terminal 10) capable of executing a print function. The printer 100 comprises an operation unit 112, a display unit 114, a Wi-Fi I/F 116, a print executing unit 118, and a controller 130. A model name MN1 and a serial number SN1 are assigned to the printer 100.

The operation unit 112 is constituted of a plurality of keys. The user can input various instructions to the printer 100 by operating the operation unit 112. In the present embodiment, the operation unit 112 does not include any keys for inputting a character string. In a variant, the operation unit 112 may include key(s) for inputting a character string. The display unit 114 is a display for displaying various types of information. The print executing unit 118 is a printing mechanism of an ink jet scheme, laser scheme, or the like.

The Wi-Fi I/F 116 is the same as the Wi-Fi I/F 16 of the mobile terminal 10 except that the Wi-Fi I/F 116 supports only the 2.4 GHz frequency band and does not support the 5.0 GHz frequency band. That is, the Wi-Fi I/F 116 is capable of establishing an AP connection with an AP in accordance with the normal Wi-Fi scheme and is also capable of establishing a WFD connection with an external device (e.g., the mobile terminal 10) in accordance with the WFD scheme. Further, although the Wi-Fi I/F 116 is physically a single interface, the Wi-Fi I/F 116 has a first MAC address for establishing an AP connection and a second MAC address (i.e., a MAC address different from the first MAC address) for establishing a WFD connection. Consequently, the Wi-Fi I/F 116 is capable of simultaneously executing both wireless communications using an AP connection and wireless communication using a WFD connection.

The controller 130 comprises a CPU 132 and a memory 134. The CPU 132 is configured to execute various processes in accordance with a program 136 stored in the memory 134. The memory 134 is constituted of a volatile memory, non-volatile memory, and the like. Further, the memory 134 stores scheme information 140. The scheme information 140 is information indicating a combination of an authentication scheme and an encryption scheme supported by the printer 100, and in the present embodiment, it indicates a combination of an authentication scheme "WPA (abbreviation of Wi-Fi Protected Access) 2" and an encryption scheme "AES (abbreviation of Advanced Encryption Standard)". That is, although the printer 100 is capable of executing wireless communication according to the aforementioned combination, the printer 100 is not capable of executing wireless communication according to a combination different from the aforementioned combination (e.g., a combination of the authentication scheme "WPA2" and an encryption scheme "TKIP (abbreviation of Temporal Key Integrity Protocol)"). The scheme information 140 is not limited to the combination of the authentication scheme "WPA2" and the encryption scheme "AES", and may include another authentication scheme (e.g., "WPA", etc.) and/or another encryption scheme (e.g., "TKIP", etc.).

(Configurations of APs 6, 7)

Each of the APs 6, 7 is a known AP called a wireless AP, a wireless LAN router, and the like. Each of the APs 6, 7 relays communication between a pair of devices that belong to a wireless network formed by the AP. The AP 6 supports both 2.4 GHz and 5.0 GHz, stores an SSID (abbreviation of Service Set Identifier) "abc" and a password "P1" for a wireless network in which the 2.4 GHz frequency band is used, and stores an SSID "def" and a password "P2" for a wireless network in which the 5.0 GHz frequency band is used. An SSID is information for identifying an AP (in other words, a wireless network formed by the AP). Further, the AP 6 stores the combination of the authentication scheme "WPA2" and the encryption scheme "AES" as scheme information supported by the AP 6.

The AP 7 supports only 2.4 GHz and does not support 5.0 GHz. The AP 7 stores an SSID "ghi" and a password "P3" for a wireless network in which the 2.4 GHz frequency band is used. Further, the AP 7 stores a combination of the authentication scheme "WPA2" and the encryption scheme "TKIP" as scheme information supported by the AP 7.

(Advance Preparation)

As described above, the printer 100 does not include any keys for inputting a character string. Therefore, the user cannot input information for establishing an AP connection (e.g., an SSID, a password, etc.) into the printer 100. In the present embodiment, the user establishes an AP connection between the printer 100 and an AP (e.g., 6) by using the app 38 installed in the mobile terminal 10. In order to establish the AP connection, it is necessary to establish a WFD connection between the mobile terminal 10 and the printer 100. Therefore, the user establishes the WFD connection as an advance preparation.

Below, to facilitate understanding, operations executed by CPUs of the devices (e.g., the CPU 32 of the mobile terminal 10) will be described with these devices (e.g., the mobile terminal 10) as the subject of action, not with the CPUs described as the subject of action. Further, the CPU 32 of the mobile terminal 10 is configured to execute processes in accordance with the OS 36 or the app 38. Consequently, below, the subject of action in processes executed by the CPU 32 in accordance with the OS 36 will be referred to as "mobile terminal 10 (OS)", and the subject of action in processes executed by the CPU 32 in accordance with the app 38 will be referred to as "mobile terminal 10 (app)". Further, since all communications described below are executed via the Wi-Fi I/F 16 (or 116), "via the Wi-Fi I/F 16 (or 116)" will be omitted.

The printer 100 accepts, from the user, a G/O shift operation for shifting a state of the printer 100 from a device state to a Group Owner (referred to as "G/O" below) state of the WFD scheme. In this case, the printer 100 shifts from the device state to the G/O state.

Then, the mobile terminal 10 (OS) accepts, from the user, a WFD connection operation for establishing a WFD connection with the printer 100 and establishes a WFD connection with the printer 100. Specifically, the mobile terminal 10 (OS) sends a Probe request by broadcast for searching for a parent station (e.g., a G/O, an AP, etc.) of a wireless network present around the mobile terminal 10. Then, from each of one or more parent stations including the printer 100 which is operating as the G/O, the mobile terminal 10 (OS) receives a Probe response including an SSID for identifying the wireless network formed by the parent station. Next, the mobile terminal 10 (OS) causes the display unit 14 to display an SSID list including the received SSIDs. Upon when an SSID of the printer 100, which is the G/O, is selected from the SSID list by the user, the mobile terminal 10 (OS) sends a Probe request including the selected SSID to the printer 100 by unicast.

Then, the mobile terminal 10 (OS) receives a Probe response from the printer 100, and further executes communication of various signals (Provision Discovery signal, Association signal, WPS Exchange, 4way-handshake, etc.) with the printer 100. In the process of executing the WPS Exchange communication, the mobile terminal 10 (OS) receives a password from the printer 100, and the password is used in the process of the 4way-handshake communication. Upon when authentication of the password succeeds in the printer 100, the mobile terminal 10 (OS) establishes a WFD connection with the printer 100 and participates, as a child station, in the wireless network in which the printer 100 operates as the G/O. As a result, the advance preparation is completed.

Figure 2:
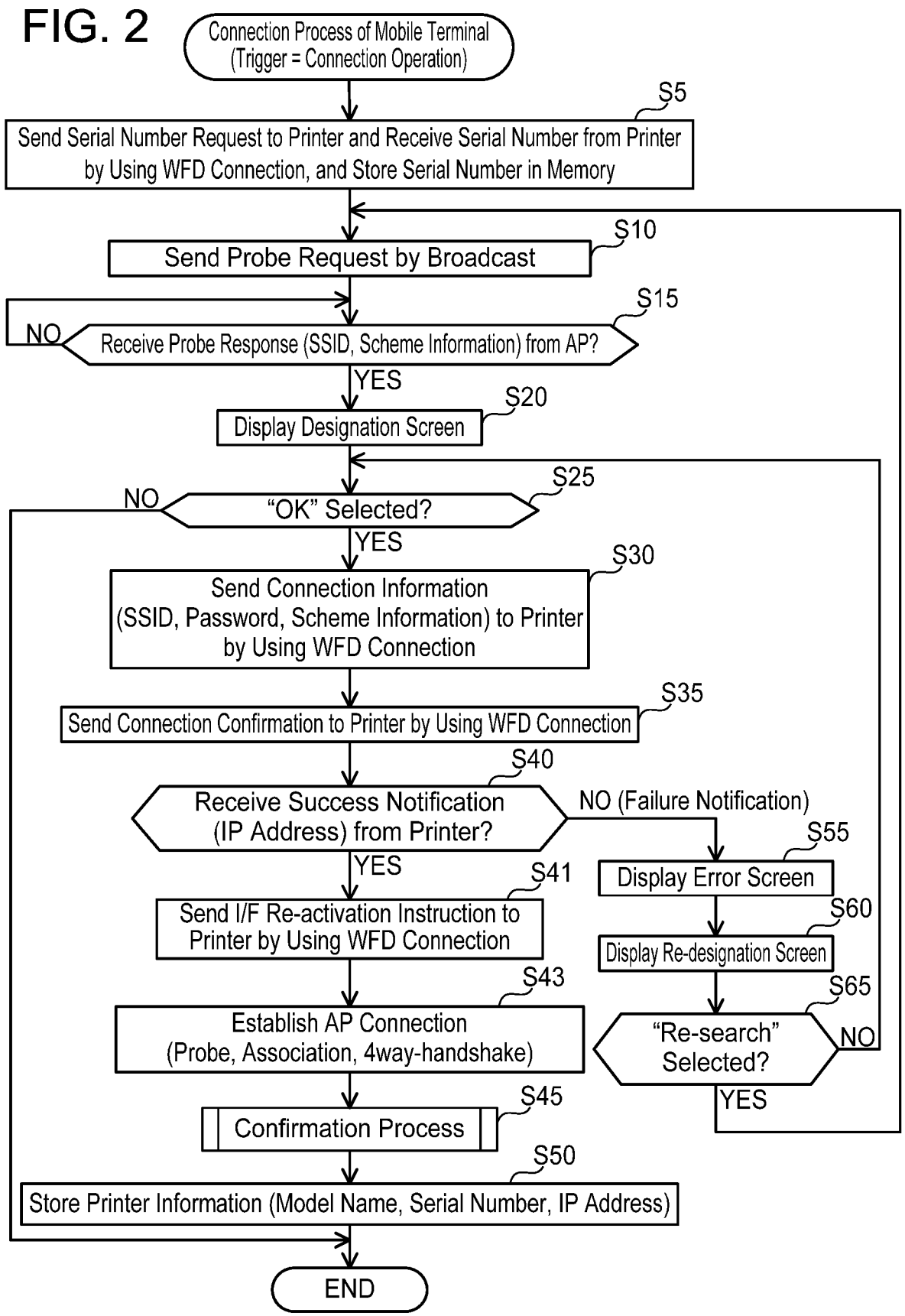
FIG. 2 shows a flowchart of a connection process of a mobile terminal.

(Connection Process of Mobile Terminal 10; FIG. 2)

Next, a connection process executed by the CPU 32 of the mobile terminal 10 will be described with reference to FIG. 2. The connection process is a process for establishing an AP connection between the printer 100 and an AP by using the app 38. The process of FIG. 2 is executed in a case where the app 38 is activated in the mobile terminal 10 after the advance preparation described above has been completed and then a printer connection operation for executing the connection process is accepted from the user.

In S5, by using the WFD connection (i.e., not via an access point), the mobile terminal 10 (app) sends to the printer 100 a serial number request for requesting a serial number to be sent, and receives the serial number SN1 from the printer 100. Next, the mobile terminal 10 (app) stores the received serial number SN1 in the memory 34.

In S10, the mobile terminal 10 (app) instructs the OS 36 to search for an AP present around the mobile terminal 10. In this case, the mobile terminal 10 (OS) sends a Probe request by broadcast.

In S15, the mobile terminal 10 (app) determines whether a Probe response has been received from an AP. Specifically, the following process is executed. In response to sending the Probe request in S10, the mobile terminal 10 (OS) receives a Probe response including an SSID and scheme information (i.e., a combination of authentication scheme and encryption scheme) from an AP present around the mobile terminal 10. In this case, the mobile terminal 10 (OS) supplies the respective information (i.e., the SSID and the scheme information) in the Probe response to the app 38. In a case of acquiring the respective information from the OS 36, the mobile terminal 10 (app) determines that the Probe response has been received from the AP (YES in S15) and proceeds to S20. Here, the mobile terminal 10 (app) stores the SSID and the scheme information acquired from the OS 36 in association with each another. In particular, in a case of acquiring respective information in a plurality of Probe responses from the OS 36, the mobile terminal 10 (app) stores, for each of the plurality of Probe responses, the SSID and the scheme information in the Probe response in association with each another.

In S20, the mobile terminal 10 (app) causes the display unit 14 to display a designation screen by using the respective information (i.e., the SSID and the scheme information) acquired in S15. The designation screen includes a first designation area for designating an SSID, a second designation area for designating a password, an OK button, and a Cancel button indicating cancellation of the connection process.

In S25, the mobile terminal 10 (app) determines whether the OK button in the designation screen has been selected by the user. In a case where an SSID and a password are designated by the user and the OK button is selected by the user in the designation screen (YES in S25), the mobile terminal 10 (app) proceeds to S30. Below, an AP identified by the SSID designated here will be referred to as "target AP". On the other hand, in a case where the Cancel button is selected by the user in the designation screen (NO in S25), the mobile terminal 10 (app) ends the process of FIG. 2.

In S30, the mobile terminal 10 (app) sends connection information to the printer 100 by using the WFD connection (i.e., not via an access point). The connection information includes the designated SSID, the designated password, and the scheme information stored in S15 in association with the designated SSID.

In S35, the mobile terminal 10 (app) sends a connection confirmation to the printer 100 by using the WFD connection. The connection confirmation is a signal for confirming whether establishment of an AP connection has succeeded. In the present embodiment, the mobile terminal 10 (app) sends the connection confirmation to the printer 100 after a predetermined time has elapsed since the connection information was sent to the printer 100. In a variant, the mobile terminal 10 (app) may repeatedly send the connection confirmation to the printer 100 in response to the sending of the connection information to the printer 100.

In S40, the mobile terminal 10 (app) determines whether a success notification has been received from the printer 100 by using the WFD connection. The success notification is a notification indicating that establishment of an AP connection has succeeded and includes an IP address of the printer 100. In a case of receiving the success notification from the printer 100, the mobile terminal 10 (app) determines YES in S40 and proceeds to S41. On the other hand, in a case of receiving a failure notification from the printer 100, the mobile terminal 10 (app) determines NO in S40 and proceeds to S55. The failure notification is a notification indicating that establishment of an AP connection has failed and includes error information indicating that the failure to establish an AP connection is due to a certain parameter among the plurality of parameters included in the connection information sent in S30.

In S41, the mobile terminal 10 (app) sends, to the printer 100 by using the WFD connection, an I/F re-activation instruction for re-activating the Wi-Fi I/F 116 of the printer 100. Thereby, in the printer 100, after energization to the Wi-Fi I/F 116 had been stopped, the energization to the Wi-Fi I/F 116 is resumed. Since the energization to the Wi-Fi I/F 116 is stopped, the WFD connection between the mobile terminal 10 and the printer 100 is disconnected. Further, the AP connection between the printer 100 and the target AP is also disconnected. However, upon when the energization to the Wi-Fi I/F 116 is resumed, the printer 100 re-establishes an AP connection with the target AP by using the connection information (see S30) received from the mobile terminal 10.

In S43, the mobile terminal 10 establishes an AP connection with the target AP by using the connection information designated in S25. Specifically, the mobile terminal 10 sends a Probe request including the designated SSID (i.e., a unicast Probe request) to the target AP, and receives a Probe response from the target AP. The mobile terminal 10 further executes communication of various signals (Association signal, 4way-handshake, etc.) with the target AP. Thereby, the mobile terminal 10 establishes an AP connection with the target AP, and participates as a child station in the wireless network formed by the target AP. As a result, both the mobile terminal 10 and the printer 100 come to belong to the wireless network.

In S45, the mobile terminal 10 (app) executes a confirmation process. The confirmation process is a process for confirming that the AP connection has been re-established between the printer 100 and the target AP. In the confirmation process, the mobile terminal 10 (app) receives, from the printer 100 via the target AP, the model name of the printer 100, the serial number of the printer 100, and the IP address of the printer 100.

In S50, the mobile terminal 10 (app) stores, in the memory 34, printer information including the model name, the serial number, and the IP address received from the printer 100 in S45. When the process of S50 ends, the process of FIG. 2 ends.

In S55, the mobile terminal 10 (app) causes the display unit 14 to display an error screen corresponding to the error information included in the failure notification received from the printer 100. The error screen includes a character string indicating that the process for the printer 100 to establish an AP connection has failed due to the parameter indicated by the error information among the plurality of parameters (i.e., the SSID, the password, the scheme information) in the connection information sent in S30.

In S60, the mobile terminal 10 (app) causes the display unit 14 to display a re-designation screen for designating new connection information. The re-designation screen includes a first designation area for designating an SSID, a second designation area for designating a password, an OK button, a Cancel button, and a re-search button. The re-search button is a button for re-searching for an AP present around the mobile terminal 10. In the re-designation screen, one of the first designation area and the second designation area is emphasized in comparison with the other one of the areas according to the error information included in the failure notification received from the printer 100.

In S65, the mobile terminal 10 (app) determines whether the re-search button in the re-designation screen has been selected by the user. In a case where the re-search button is selected, the mobile terminal 10 (app) determines YES in S65 and returns to S10. On the other hand, in a case where the re-search button is not selected, the mobile terminal 10 (app) returns to S25. Thereafter, in a case where an SSID and a password are again designated and the OK button is selected in the re-designation screen (YES in S25), the mobile terminal 10 (app) executes the process from S30 onward again.

Figure 3:
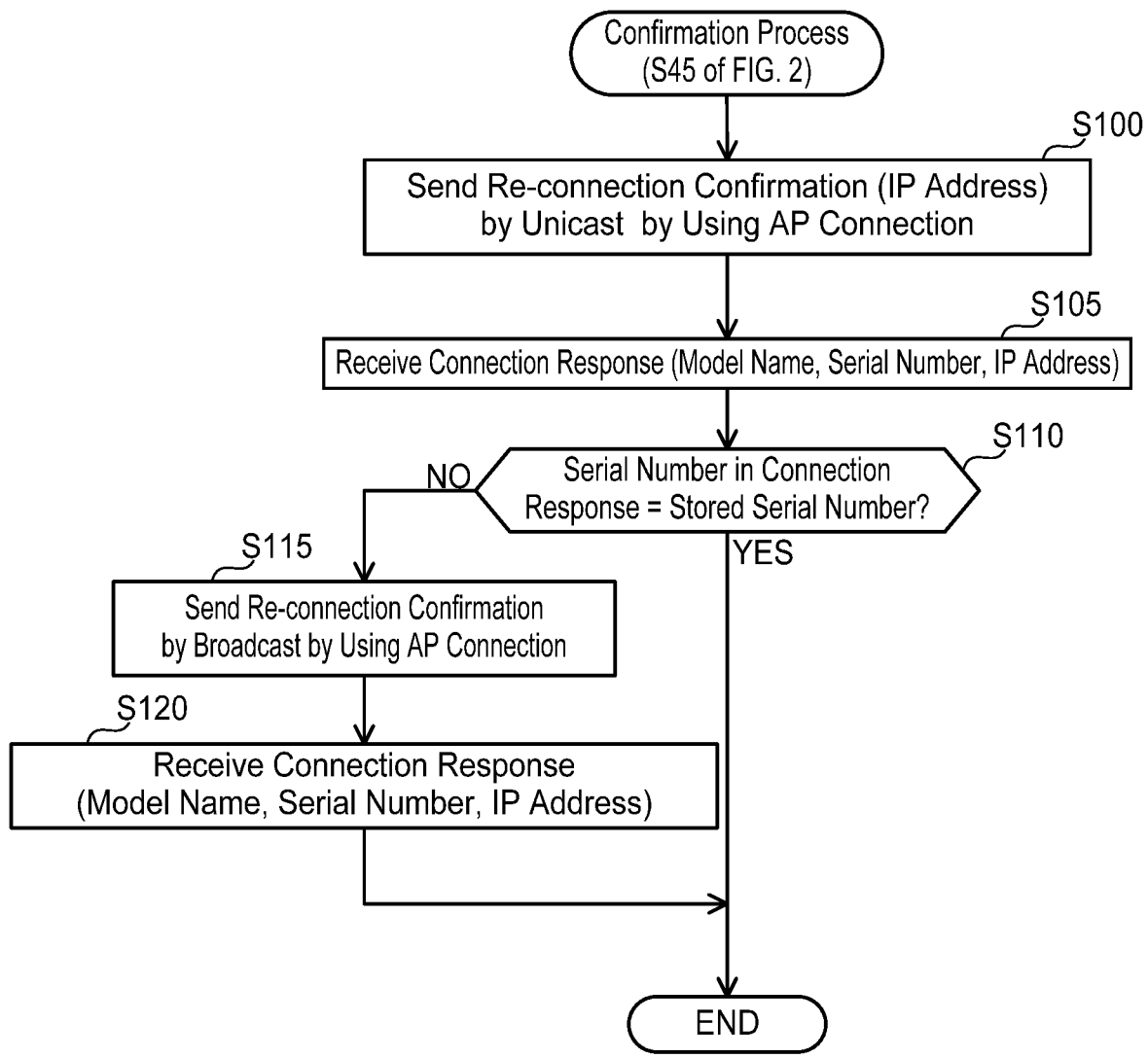
FIG. 3 shows a flowchart of a confirmation process.

(Confirmation Process; FIG. 3)

Next, contents of the confirmation process executed in S45 of FIG. 2 will be described with reference to FIG. 3. In S100, the mobile terminal 10 (app) sends a re-connection confirmation by using the AP connection established in S43 of FIG. 2 (i.e., via the target AP). The re-connection confirmation includes the IP address in the success notification received in S40 of FIG. 2 as an IP address of its sending destination. That is, the re-connection confirmation is sent by unicast. The re-connection confirmation is a signal for confirming whether the AP connection between the printer 100 and the target AP has been re-established.

In S105, the mobile terminal 10 (app) receives a connection response, which is a response to the re-connection confirmation, by using the AP connection. Below, the printer that is the sending source of the connection response will be referred to as "sending source printer". The connection response includes a model name of the sending source printer, a serial number of the sending source printer, and an IP address of the sending source printer.

In S110, the mobile terminal 10 (app) determines whether the serial number of the sending source printer in the connection response matches the serial number of the printer 100 stored in S5 of FIG. 2. In a case of determining that the serial number of the sending source printer matches the serial number of the printer 100, that is, in a case where the sending source printer matches the printer 100, the mobile terminal 10 (app) determines YES in S110 and ends the process of FIG. 3. On the other hand, in a case of determining that the serial number of the sending source printer does not match the serial number of the printer 100, that is, in a case where the sending source printer does not match the printer 100, the mobile terminal 10 (app) determines NO in S110, and proceeds to S115.

Here, the following is assumed as a situation in which NO is determined in S110. When the I/F re-activation instruction is sent from the mobile terminal 10 to the printer 100 in S41 of FIG. 2, the AP connection between the printer 100 and the target AP is disconnected, and thereafter the AP connection between the printer 100 and the target AP is re-established. If an AP connection is established between a device (e.g., a printer) different from the printer 100 and the target AP before the AP connection between the printer 100 and the target AP is re-established, the IP address assigned to the printer 100 (i.e., the IP address in the success notification received in S40) may be assigned to that device. In this case, the sending source printer is the device, thus the sending source printer does not match the printer 100 and NO is determined in S110.

In S115, the mobile terminal 10 (app) sends a connection confirmation by broadcast via the target AP by using the AP connection. As a result, in S120, the mobile terminal 10 (app) receives a plurality of connection responses from the plurality of printers participating in the wireless network formed by the target AP. In this case, the mobile terminal 10 (app) specifies the connection response that includes the serial number of the printer 100 stored in S5 of FIG. 2 from among the plurality of connection responses. Thereby, the mobile terminal 10 (app) can confirm that the AP connection between the printer 100 and the target AP has been re-established. The mobile terminal 10 (app) can be informed of the model name, serial number, and IP address of the printer 100 included in the specified connection response. When the process of S120 ends, the process of FIG. 3 ends.

Figure 4:
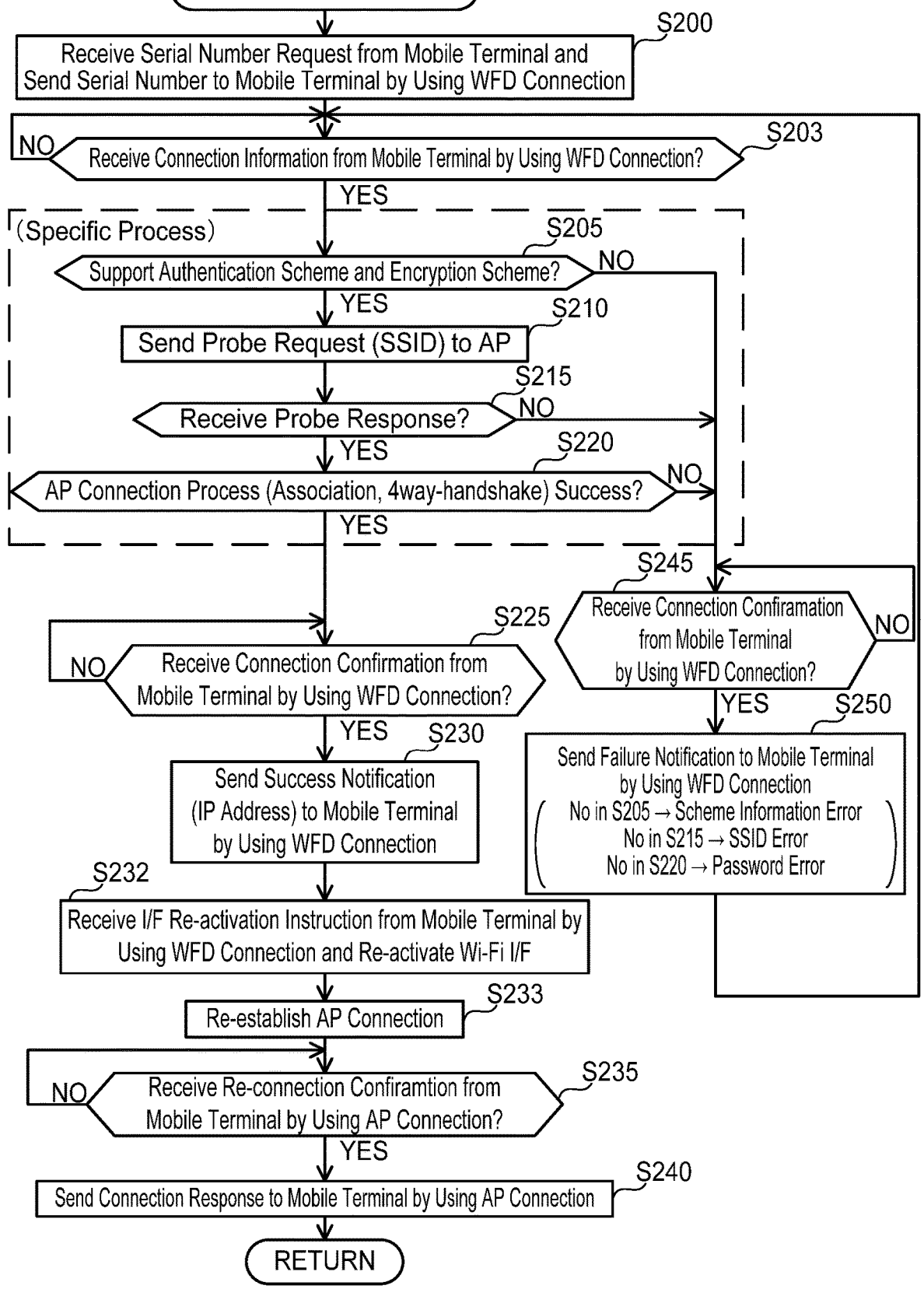
FIG. 4 shows a flowchart of a connection process of a printer.

(Connection Process of Printer 100; FIG. 4)

Next, a connection process executed by the CPU 132 of the printer 100 will be described with reference to FIG. 4. The process of FIG. 4 is executed after the WFD connection has been established between the printer 100 and the mobile terminal 10 by the advance preparation described above having been executed.

In S200, the printer 100 receives the serial number request from the mobile terminal 10 by using the WFD connection and sends the serial number SN1 of the printer 100 to the mobile terminal 10 (see S5 of FIG. 2).

In S203, the printer 100 monitors whether the connection information is received from the mobile terminal 10 by using the WFD connection (see S30 of FIG. 2). In a case of receiving the connection information from the mobile terminal 10, the printer 100 determines YES in S203 and executes a specific process (i.e., S205 to S220, to be described later) for establishing an AP connection with the target AP.

In S205, the printer 100 determines whether scheme information in the received connection information matches the scheme information 140 in the memory 134. In a case of determining that the received scheme information matches the scheme information 140, that is, in a case where the printer 100 supports the received scheme information, the printer 100 determines YES in S205 and proceeds to S210. On the other hand, in a case of determining that the received scheme information does not match the scheme information 140, that is, in a case where the printer 100 does not support the received scheme information, the printer 100 determines NO in S205 (i.e., determines that the specific process has failed) and proceeds to S245.

In S210, the printer 100 sends a Probe request including the SSID in the received connection information (i.e., a unicast Probe request) to the target AP.

In S215, the printer 100 monitors whether a Probe response is received from the target AP. In a case of receiving a Probe response from the target AP, the printer 100 determines YES in S215 and proceeds to S220. On the other hand, in a case where a Probe response is not received even when a predetermined time has elapsed since the Probe request was sent in S210, the printer 100 determines NO in S215 (i.e., determines that the specific process has failed) and proceeds to S245.

Here, the followings are assumed as situations in which NO is determined in S215. A first situation is a situation in which the printer 100 is incapable of communicating with the target AP. This situation includes, for example, a situation in which the target AP is located away from the printer 100, a situation in which the power of the target AP is OFF, and the like. A second situation is a situation in which the wireless network identified by the SSID in the connection information received in S203 is a wireless network in which a frequency band that is not supported by the printer 100 is used.

In S220, the printer 100 determines whether an AP connection process has succeeded. Specifically, after having received the Probe response from the target AP, the printer 100 executes communication of an Association signal with the target AP and executes a 4way-handshake with the target AP. The 4way-handshake is executed as follows.

The printer 100 firstly generates a first shared key from the password in the received connection information. Next, the printer 100 sends the MAC address of the printer 100 to the target AP and receives a first encryption key from the target AP. The first encryption key is generated in the target AP by using a second shared key generated from the password of the target AP and the MAC address of the printer 100. In a case of receiving the first encryption key from the target AP, the printer 100 generates a second encryption key by using the generated first shared key and the MAC address of the printer 100. Then, the printer 100 determines whether the first encryption key matches the second encryption key. In a case of determining that the first encryption key matches the second encryption key, the printer 100 completes the 4way-handshake with the target AP and establishes an AP connection with the target AP. Further, the printer 100 receives the IP address of the printer 100 from the target AP which functions as an IP address assigning server. In this case, the printer 100 determines YES in S220 (i.e., determines that the specific process has succeeded) and proceeds to S225. On the other hand, in a case of determining that the first encryption key does not match the second encryption key, the printer 100 cancels the 4way-handshake with the target AP. In this case, the printer 100 determines NO in S220 (i.e., determines that the specific process has failed) and proceeds to S245.

As described above, the first encryption key is generated by using the password of the target AP, and the second encryption key is generated by using the password in the connection information. Thus, mismatch between the first encryption key and the second encryption key (i.e., determination of NO in S220) means that the password of the target AP and the password in the connection information are different.

In S225, the printer 100 monitors whether the connection confirmation is received from the mobile terminal 10 by using the WFD connection (see S35 of FIG. 2). In a case of receiving the connection confirmation from the mobile terminal 10, the printer 100 determines YES in S225 and proceeds to S230.

In S230, the printer 100 sends the success notification to the mobile terminal 10 by using the WFD connection (see YES in S40 of FIG. 2). This success notification includes the IP address of the printer 100 received from the target AP in S220.

In S232, the printer 100 receives the I/F re-activation instruction from the mobile terminal 10 by using the WFD connection and re-activates the Wi-Fi I/F 116 (see S41 of FIG. 2). Specifically, the printer 100 firstly stops the energization to the Wi-Fi I/F 116. Thereby, both the WFD connection between the printer 100 and the mobile terminal 10 and the AP connection between the printer 100 and the target AP are disconnected. Thereafter, the printer 100 resumes the energization to the Wi-Fi I/F 116.

In S233, the printer 100 executes the specific process described above (i.e., S205 to S220) again and re-establishes an AP connection with the target AP. Here, the printer 100 does not re-establish a WFD connection with the mobile terminal 10. In a state where both an AP connection and a WFD connection are established simultaneously, the processing load on the printer 100 is high. In the present embodiment, in a case of receiving the I/F re-activation instruction from the mobile terminal 10, the printer 100 shifts to a state in which only the AP connection is established. Therefore, the processing load on the printer 100 can be reduced.

In S235, the printer 100 monitors whether the re-connection confirmation is received from the mobile terminal 10 by using the AP connection (i.e., via the target AP) (see S100, S115 of FIG. 3). In a case of receiving the re-connection confirmation from the mobile terminal 10, the printer 100 determines YES in S235 and proceeds to S240.

In S240, the printer 100 sends the connection response to the mobile terminal 10 by using the AP connection. This connection response includes the model name MN1 of the printer 100, the serial number SN1 of the printer 100, and the IP address of the printer 100. When the process of S240 ends, the process of FIG. 4 ends.

S245 is the same as S225. In S250, the printer 100 sends the failure notification including error information to the mobile terminal 10 by using the WFD connection. In the case where NO is determined in S205, that is, in a case where the printer 100 does not support the scheme information in the received connection information, the error information indicates that the specific process has failed due to the scheme information. In the case where NO is determined in S215, an SSID needs to be designated again, and therefore the error information indicates that the specific process has failed due to the SSID. In the case where NO is determined in S220, the error information indicates that the specific process has failed due to the password. When the process of S250 ends, the process returns to S203.

Figure 5:
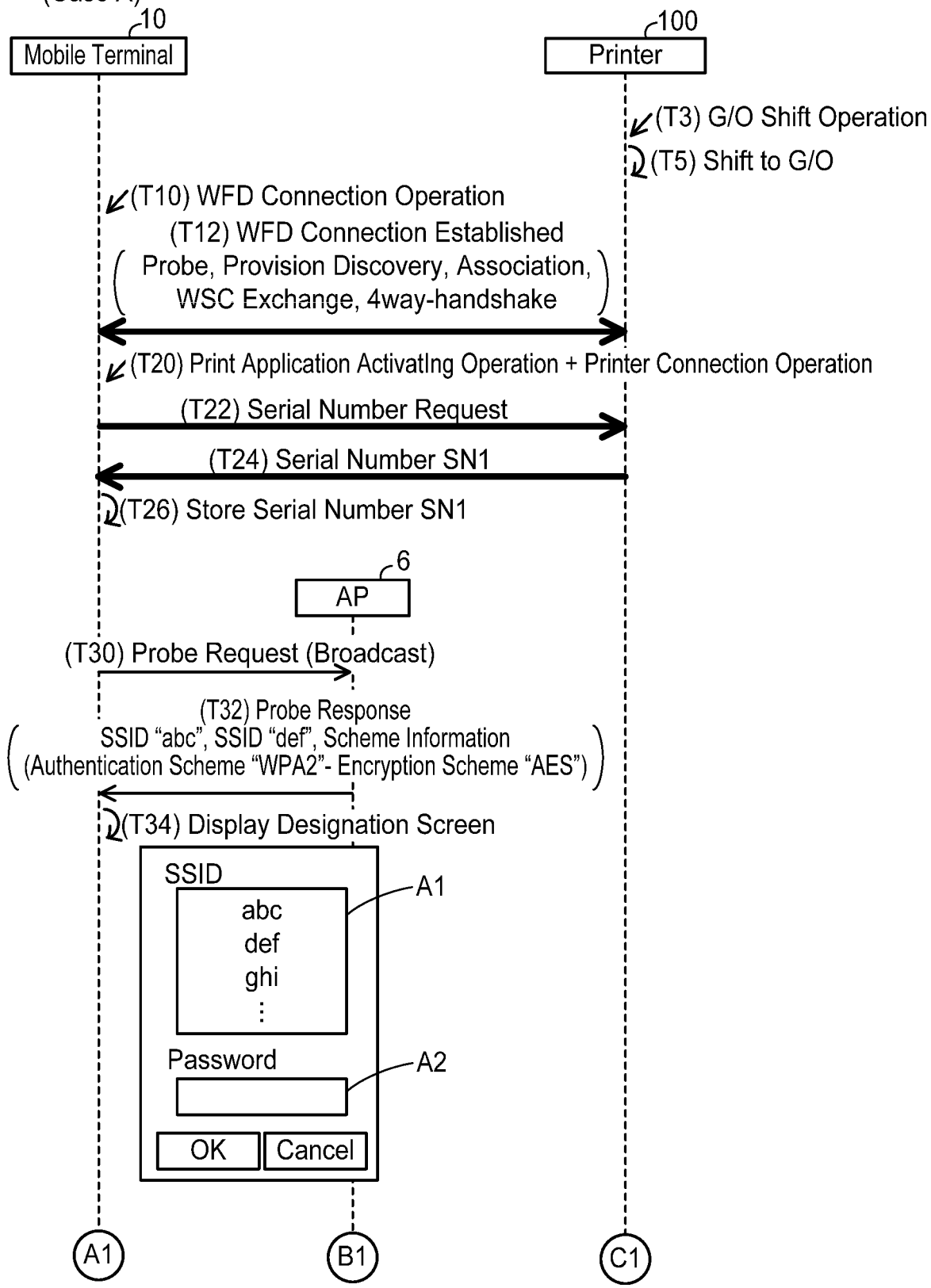
FIG. 5 shows a sequence diagram of a case A in which establishment of an AP connection succeeds.
Figure 6:
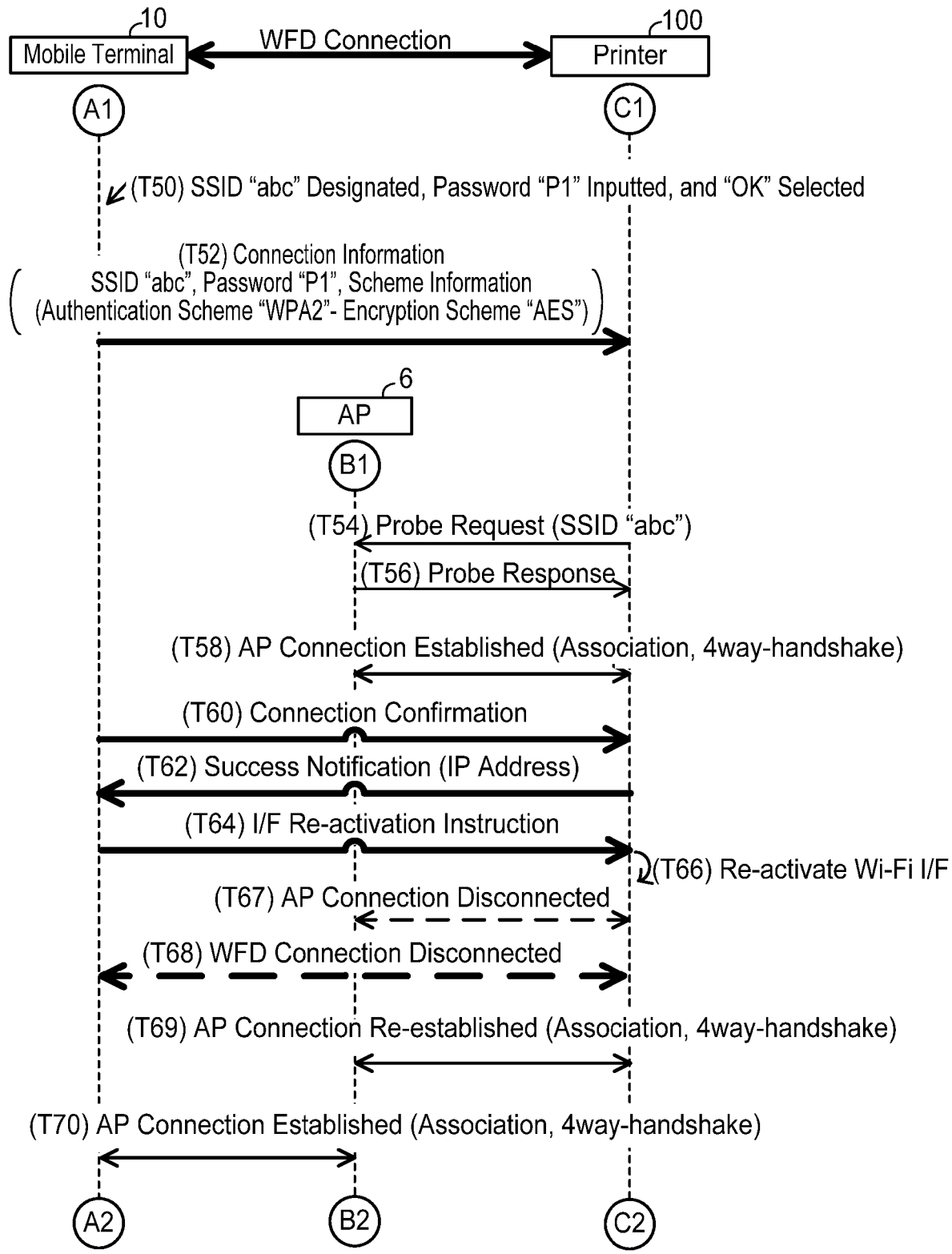
FIG. 6 shows a continued sequence diagram of FIG. 5.
Figure 7:
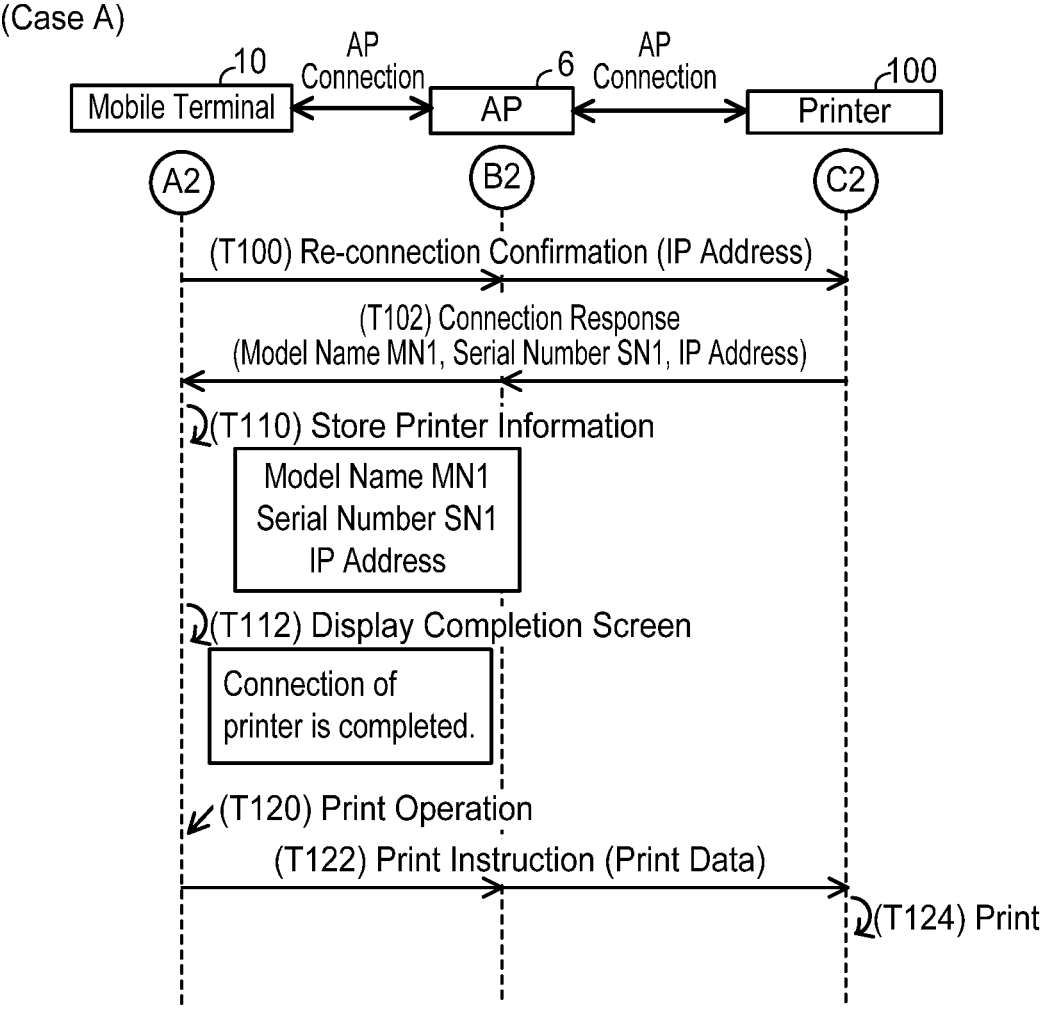
FIG. 7 shows a continued sequence diagram of FIG. 6.

(Case A; FIG. 5 to FIG. 7)

Next, specific cases realized by the processes of FIG. 2 to FIG. 4 will be described with reference to FIG. 5 to FIG. 10. In FIG. 5 to FIG. 12, thick arrows and thin arrows between the devices 10, 100 and the like respectively indicate wireless communication according to the WFD scheme and wireless communication according to the normal Wi-Fi scheme. First, a case A, in which establishment of an AP connection between the printer 100 and the AP 6 succeeds, will be described with reference to FIG. 5. In an initial state of FIG. 5, the printer 100 is operating in the device state.

In response to accepting a G/O shift operation from the user in T3, the printer 100 shifts from the device state to the G/O state in T5.

In response to accepting a WFD connection operation from the user in T10, the mobile terminal 10 (OS) executes communication of various signals (Probe signal, Provision Discovery signal, Association signal, WPS Exchange, 4way-handshake etc.) with the printer 100, establishes a WFD connection with the printer 100, and participates as a child station in the wireless network in which the printer 100 operates as the G/O in T12. Thereby, the advance preparation is completed.

In response to accepting an operation for activating the app 38 from the user in T20, the mobile terminal 10 activates the app 38. Then, in response to accepting a printer connection operation from the user, the mobile terminal 10 sends a serial number request to the printer 100 by using the WFD connection in T22 (S5 of FIG. 2).

In response to receiving the serial number request from the mobile terminal 10 in T22, the printer 100 sends the serial number SN1 of the printer 100 to the mobile terminal 10 by using the WFD connection in T24 (S200 of FIG. 4).

In response to receiving the serial number SN1 from the printer 100 in T24, the mobile terminal 10 (app) stores the serial number SN1 in T26 (S5 of FIG. 2).

The mobile terminal 10 sends a Probe request by broadcast in T30 (S10 of FIG. 2) and receives two Probe responses from the AP 6 in T32 (YES in S15). One of the Probe responses includes the SSID "abc" identifying the wireless network in which the 2.4 GHz frequency band is used and the scheme information supported by the AP 6 (i.e., the combination of the authentication scheme "WPA2" and the encryption scheme "AES"). Further, the other one of the Probe responses includes the SSID "def" identifying the wireless network in which the 5.0 GHz frequency band is used and the aforementioned scheme information. The mobile terminal 10 stores the SSID "abc" in association with the aforementioned scheme information as well as stores the SSID "def" in association with the aforementioned scheme information. Although not shown, the mobile terminal 10 further receives a Probe response from the AP 7 and stores the SSID "ghi" in association with the scheme information supported by the AP 7 (i.e., the combination of the authentication scheme "WPA2" and the encryption scheme "TKIP").

In T34, the mobile terminal 10 (app) displays the designation screen (S20). This designation screen includes a first designation area A1 for designating an SSID, a second designation area A2 for designating a password, an OK button, and a Cancel button. The first designation area A1 includes a list of the plurality of SSIDs in the received plurality of Probe responses. The user can designate one SSID from the list in the first designation area A1. Further, the user can input a password to the second designation area A2 by operating the operation unit 12. When the process of T34 ends, the process of FIG. 5 ends.

(Continuation of FIG. 5; FIG. 6)

Next, a process that is a continuation of FIG. 5 will be described with reference to FIG. 6. In T50, the mobile terminal 10 (app) accepts, from the user, designation of the SSID "abc" in the first designation area A1, input of the password "P1" to the second designation area A2, and selection of the OK button in the designation screen (see T34 of FIG. 5) (YES in S25 of FIG. 2). In this case, in T52, the mobile terminal 10 (app) sends the designated connection information to the printer 100 by using the WFD connection (S30). This connection information includes the SSID "abc", the password "P1", and the scheme information stored in association with the SSID "abc" (i.e., the combination of the authentication scheme "WPA2" and the encryption scheme "AES").

In a case of receiving the connection information from the mobile terminal 10 in T52 (YES in S203 of FIG. 4), the printer 100 determines whether it supports the scheme information in the connection information (S205). In the present case, the printer 100 determines that it supports the scheme information (YES in S205), sends a Probe request including the SSID "abc" in the connection information to the AP 6 in T54 (S210), and receives a Probe response from the AP 6 in T56 (YES in S215).

In T58, the printer 100 executes the AP connection process with the AP 6. In the present case, the password "P1" of the AP 6 matches the password "P1" in the connection information, thus the printer 100 completes the 4way-handshake with the AP 6 and establishes an AP connection with the AP 6 (YES in S220 of FIG. 4). Further, the printer 100 receives the IP address of the printer 100 from the AP 6.

In T60, the mobile terminal 10 (app) sends a connection confirmation to the printer 100 by using the WFD connection (S35 of FIG. 2).

In response to receiving the connection confirmation from the mobile terminal 10 in T60 (YES in S225 of FIG. 4), the printer 100 sends a success notification to the mobile terminal 10 by using the WFD connection in T62 (S230). This success notification includes the IP address of the printer 100.

In response to receiving the success notification from the printer 100 in T62 (YES in S40 of FIG. 2), the mobile terminal 10 (app) sends an I/F re-activation instruction to the printer 100 by using the WFD connection in T64 (S42).

In response to receiving the I/F re-activation instruction from the mobile terminal 10 in T64, the printer 100 re-activates the Wi-Fi I/F 116 in T66 (S232 of FIG. 4). As a result, the AP connection between the printer 100 and the AP 6 is disconnected in T67, and the WFD connection between the printer 100 and the mobile terminal 10 is disconnected in T68. Thereafter, the printer 100 re-establishes an AP connection with the AP 6 in T69 (S233).

After sending the I/F re-activation instruction to the printer 100 in T64, the mobile terminal 10 (app) establishes an AP connection with the AP 6 in T70 (S43 of FIG. 2) by using the connection information designated in T50, that is, the SSID "abc", the password "P1", and the scheme information (i.e., the combination of the authentication scheme "WPA2" and the encryption scheme "AES"). When the process of T70 ends, the process of FIG. 6 ends.

(Continuation of FIG. 6; FIG. 7)

Next, a process that is a continuation of FIG. 6 will be described with reference to FIG. 7. In FIG. 7, the AP connection is already established between the mobile terminal 10 and the AP 6, and the AP connection is already established between the printer 100 and the AP 6. In T100, the mobile terminal 10 (app) sends a re-connection confirmation by using the AP connection (i.e., via the AP 6) (S100 of FIG. 3). This re-connection confirmation includes the IP address in the success notification received in T62 of FIG. 6.

In response to receiving the re-connection confirmation from the mobile terminal 10 in T100 (S235 of FIG. 4), the printer 100 sends a connection response to the mobile terminal 10 by using the AP connection (i.e., via the AP 6) (S240) in T102. This connection response includes the model name MN1 of the printer 100, the serial number SN1 of the printer 100, and the IP address of the printer 100.

In a case of receiving the connection response from the printer 100 in T102 (S105 of FIG. 3), the mobile terminal 10 (app) stores printer information in the memory 34 in T110 (S50 of FIG. 2). This printer information includes the model name MN1, the serial number SN1, and the IP address in the connection response.

In T112, the mobile terminal 10 (app) displays a completion screen indicating that the printer 100 has established the AP connection. Since the user can thereby be informed that the printer 100 has established the AP connection with the AP 6, the user performs in T120, on the mobile terminal 10, a print operation for causing the printer 100 to execute printing. In this case, in T122, the mobile terminal 10 (app) sends a print instruction to the printer 100 via the AP connection. The print instruction is a signal instructing the printer 100 to execute printing and includes print data representing an image to be printed.

In response to receiving the print instruction from the mobile terminal 10 in T122, the printer 100 causes the print executing unit 118 to execute printing in accordance with the print data in the print instruction in T124. When the process of T124 ends, the process of case A ends.

In the present case, the connection information is designated in the designation screen displayed on the mobile terminal 10, and this connection information is sent from the mobile terminal 10 to the printer 100 (T52 of FIG. 6). Thereby, the printer 100 can establish the AP connection with the AP 6 by using the received connection information (T58). Thus, the AP connection between the printer 100 and the AP 6 can be established without the user designating the connection information in the printer 100.

Figure 8:
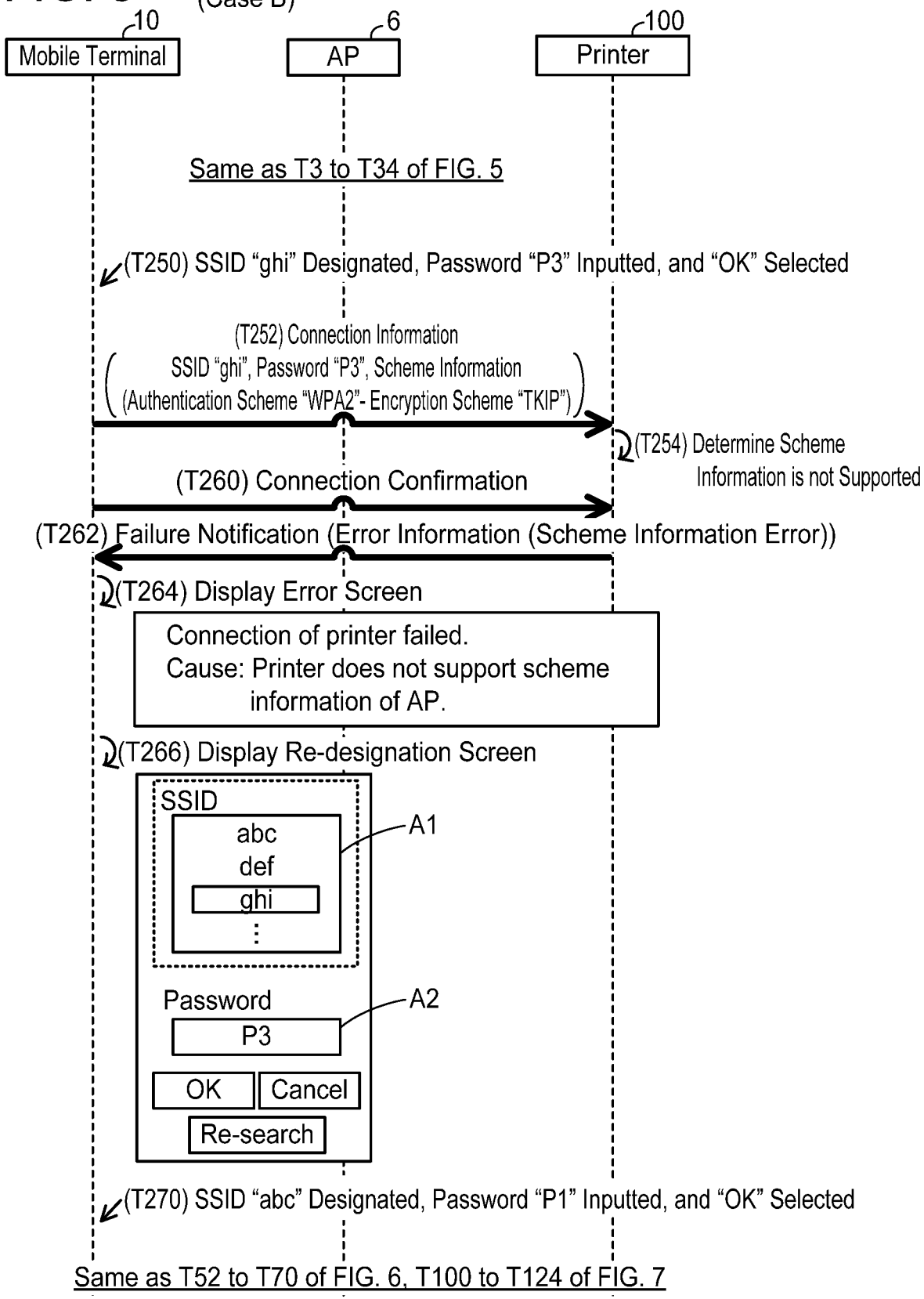
FIG. 8 shows a sequence diagram of a case B in which establishment of an AP connection fails.

(Case B; FIG. 8)

Next, a case B, in which establishment of an AP connection fails due to scheme information, will be described with reference to FIG. 8. In the present case as well, processes same as T3 to T34 of FIG. 5 are firstly executed by the devices 10, 100, and the like. That is, the WFD connection is established between the mobile terminal 10 and the printer 100 (T12 of FIG. 5), and the designation screen is displayed on the mobile terminal 10 (T34).

In the present case, the user attempts to establish an AP connection between the printer 100 and the AP 7. That is, the mobile terminal 10 (app) accepts, from the user, designation of the SSID "ghi" in the first designation area A1, input of the password "P3" in the second designation area A2, and selection of the OK button in the designation screen in T250 (YES in S25 of FIG. 2), and sends connection information to the printer 100 by using the WFD connection in T252 (S30). This connection information includes the SSID "ghi", the password "P3", and the scheme information stored in association with the SSID "ghi" (i.e., the combination of the authentication scheme "WPA2" and the encryption scheme "TKIP").

In a case of receiving the connection information from the mobile terminal 10 in T252 (YES in S203 of FIG. 4), the printer 100 determines whether it supports the scheme information in the connection information in T254 (S205). In the present case, the printer 100 does not support the scheme information, and therefore the printer 100 determines that the specific process has failed due to the scheme information (NO in S205). In this case, in response to receiving a connection confirmation from the mobile terminal 10 in T260 (YES in S245), the printer 100 sends a failure notification including error information to the mobile terminal 10 in T262 (S250). This error information indicates that the specific process has failed due to the scheme information.

In response to receiving the failure notification from the printer 100 in T262, the mobile terminal 10 (app) causes the display unit 14 to display an error screen in T264 (S55 of FIG. 2). The error screen includes a character string indicating that the printer 100 does not support the scheme information of the AP 7.

In T266, the mobile terminal 10 (app) causes the display unit 14 to display a re-designation screen (S60 of FIG. 2). In the re-designation screen, the first designation area A1 is in a state where the SSID "ghi" designated in T250 has been already designated, and the second designation area A2 is in a state where the password "P3" inputted in T250 has been already inputted. Further, in the re-designation screen, the first designation area A1 is emphasized in comparison with the second designation area A2. In the present embodiment, the first designation area A1 is emphasized by being surrounded by a broken line. In a variant, the first designation area A1 may be emphasized by being displayed to have a color different from that of other character strings in the re-designation screen. Thereby, the user can be informed that an SSID different from the SSID "ghi" should be designated in the re-designation screen. As a result, in T270, the user designates the SSID "abc" of the AP 6 and inputs the password "P1" in the re-designation screen. Then, in response to selection of the OK button by the user, the processes of T52 to T70 of FIG. 6 and T100 to T124 of FIG. 7 are executed, and an AP connection between the printer 100 and the AP 6 is established.

Figure 9:
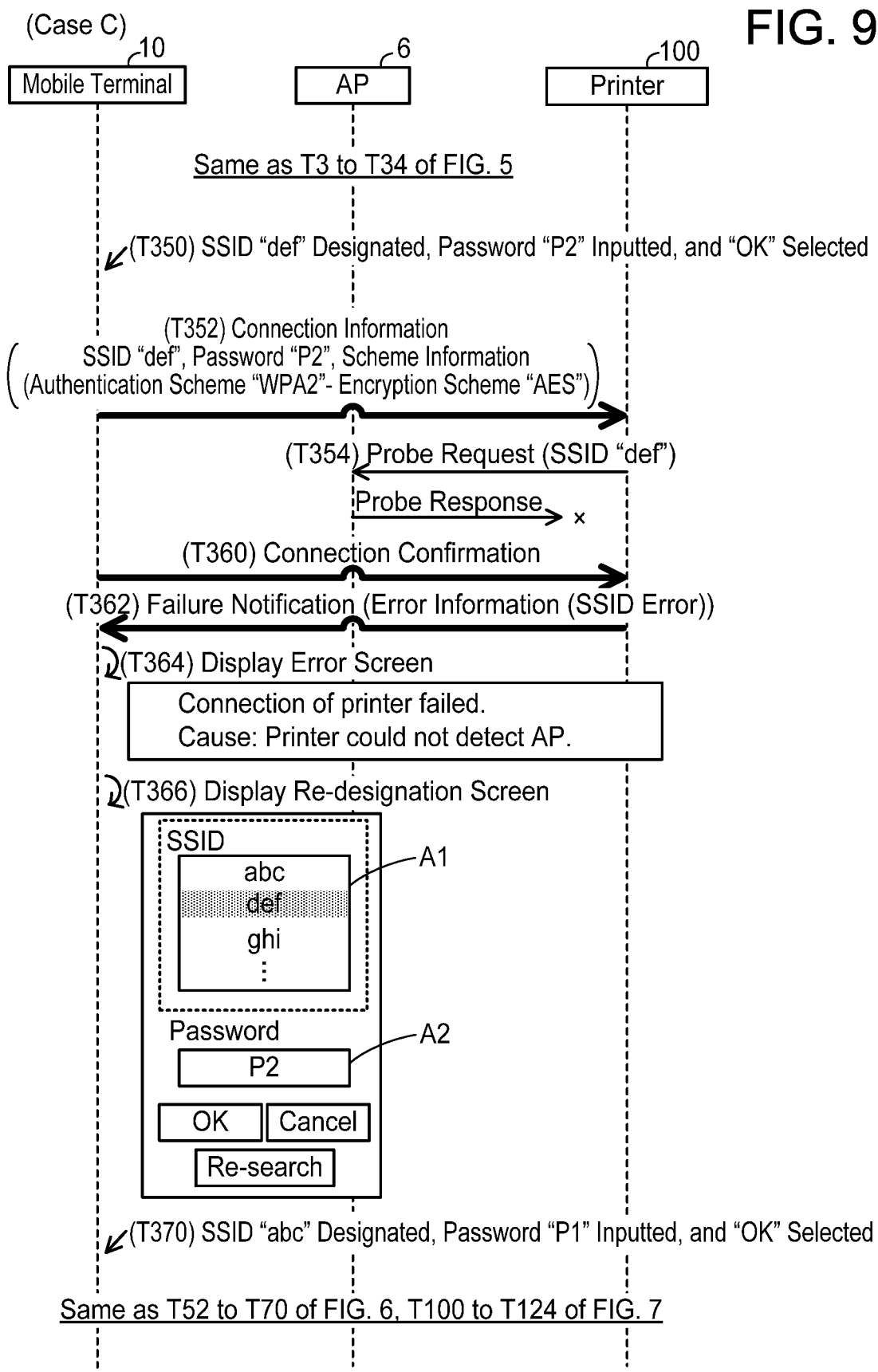
FIG. 9 shows a sequence diagram of a case C in which establishment of an AP connection fails.

(Case C; FIG. 9)

Next, a case C, in which establishment of an AP connection fails due to an SSID, will be described with reference to FIG. 9. In the present case as well, processes same as T3 to T34 of FIG. 5 are firstly executed by the devices 10, 100, and the like. That is, the WFD connection is established between the mobile terminal 10 and the printer 100 (T12 of FIG. 5), and the designation screen is displayed on the mobile terminal 10 (T34).

In the present case, despite the fact that the printer 100 does not support the 5.0 GHz frequency band, the user designates in T350 the SSID "def" that identifies the wireless network in which the 5.0 GHz frequency band is used and further inputs the password "P2" and selects the OK button. As a result, in T352, the mobile terminal 10 (app) sends the designated connection information to the printer 100 by using the WFD connection (S30). This connection information includes the SSID "def", the password "P2", and the scheme information stored in association with the SSID "def" (i.e., the combination of the authentication scheme "WPA2" and the encryption scheme "AES").

In a case of receiving the connection information from the mobile terminal 10 in T352 (YES in S203 of FIG. 4), the printer 100 determines whether it supports the scheme information in the connection information (S205). In the present case, the printer 100 determines that it supports the scheme information (YES in S205) and sends a Probe request including the SSID "def" in the connection information to the AP 6 in T354 (S210). Since the printer 100 only supports the 2.4 GHz frequency band, this Probe request is sent to the AP 6 by using the 2.4 GHz frequency band. In this case, the AP 6 determines that the SSID "def" in the Probe request is different from the SSID "abc" for the wireless network in which the 2.4 GHz frequency band is used, and does not send a Probe response. In this case, the printer 100 does not receive a Probe response even when a predetermined time has elapsed since the Probe request was sent in T354 (NO in S215), and therefore determines that the specific process has failed due to the SSID.

In response to receiving a connection confirmation from the mobile terminal 10 in T360 (YES in S245 of FIG. 4), the printer 100 sends a failure notification including error information to the mobile terminal 10 in T362 (S250). This error information indicates that the specific process has failed due to the SSID.

In response to receiving the failure notification from the printer 100 in T362, the mobile terminal 10 (app) causes the display unit 14 to display an error screen in T364 (S55 of FIG. 2). This error screen includes a character string indicating that the printer 100 could not detect an AP.

In T366, the mobile terminal 10 (app) causes the display unit 14 to display a re-designation screen (S60 of FIG. 2). In this re-designation screen, the first designation area A1 is in a state where the SSID "def" designated in T350 cannot be designated. In the present embodiment, the SSID "def" is displayed in a grayed-out manner Thereby, it is possible to prevent the SSID "def" from being designated again by the user. In a variant, the SSID "def" may not be displayed. Further, in the re-designation screen, the second designation area A2 is in a state where the password "P2" inputted in T350 has been already inputted. Further, since the error information in the failure notification indicates that the specific process has failed due to the SSID, the first designation area A1 is emphasized in comparison with the second designation area A2 in the re-designation screen. Thereby, the user can be informed that an SSID different from the SSID "def" should be designated in the re-designation screen. T370 is the same as T270 of FIG. 8. Then, the processes of T52 to T70 of FIG. 6 and T100 to T124 of FIG. 7 are executed, and an AP connection between the printer 100 and the AP 6 is established.

Figure 10:
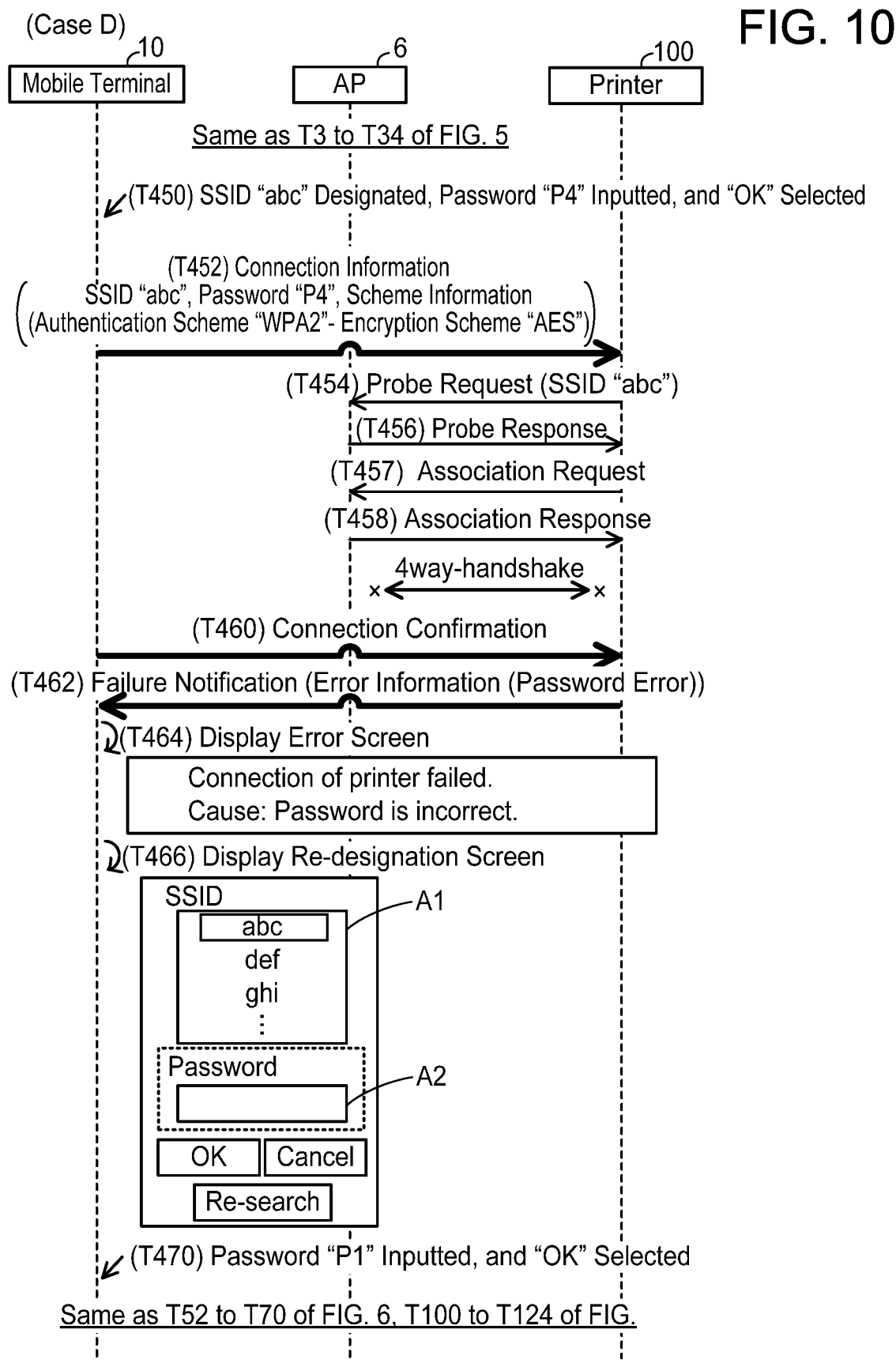
FIG. 10 shows a sequence diagram of a case D in which establishment of an AP connection fails.

(Case D; FIG. 10)

Next, a case D, in which establishment of an AP connection fails due to a password, will be described with reference to FIG. 10. In the present case as well, processes same as T3 to T34 of FIG. 5 are firstly executed by the devices 10, 100, and the like. That is, the WFD connection is established between the mobile terminal 10 and the printer 100 (T12 of FIG. 5), and the designation screen is displayed on the mobile terminal 10 (T34).

In the present case, in T450, the user designates the SSID "abc", inputs an incorrect password "P4", and selects the OK button in the designation screen. As a result, in T452, the mobile terminal 10 (app) sends the designated connection information to the printer 100 by using the WFD connection (S30). This connection information includes the SSID "abc", the password "P4", and the scheme information stored in association with the SSID "abc" (i.e., the combination of the authentication scheme "WPA2" and the encryption scheme "AES").

T454 and T456 are the same as T54 and T56 of FIG. 6. The printer 100 sends an Association request to the AP 6 in T457, receives an Association response from the AP 6 in T458, and executes communication of 4way-handshake with the AP 6. In the present case, the password "P1" of the AP 6 differs from the password "P4" in the connection information, and therefore the printer 100 cancels the communication of the 4way-handshake with the AP 6 and determines that the specific process has failed due to the password (NO in S220).

In response to receiving a connection confirmation from the mobile terminal 10 in T460 (YES in S245 of FIG. 4), the printer 100 sends a failure notification including error information to the mobile terminal 10 by using the WFD connection in T462 (S250). This error information indicates that the specific process has failed due to the password.

In response to receiving the failure notification from the printer 100 in T462, the mobile terminal 10 (app) causes the display unit 14 to display an error screen in T464 (S55 of FIG. 2). This error screen includes a character string indicating that the password is incorrect.

In T466, the mobile terminal 10 (app) causes the display unit 14 to display a re-designation screen (S60 of FIG. 2). In this re-designation screen, the first designation area A1 is in a state where the SSID "abc" designated in T450 has been already designated, and the second designation area A2 is in a state where the password "P4" inputted in T450 has not been inputted. For example, if the password "P4" has been already inputted in the second designation area A2, the user has to delete the password "P4" in order to input a new password. In contrast, in the present embodiment, the password "P4" has not been inputted in the second designation area A2, and therefore the user does not have to perform an operation to delete the password "P4". Therefore, user convenience is improved.

Further, since the error information in the failure notification indicates that the specific process has failed due to the password, the second designation area A2 is emphasized in comparison with the first designation area A1 in the re-designation screen. Thereby, the user can be informed that a new password should be designated in the re-designation screen. As a result, in T470, the user inputs a new password "P1" and selects the OK button in the re-designation screen. Then, the processes of T52 to T70 of FIG. 6 and T100 to T124 of FIG. 7 are executed, and an AP connection between the printer 100 and the AP 6 is established.

Effect of Present Embodiment

In the present embodiment, in the case of receiving, from the printer 100, the failure notification including error information indicating that establishment of an AP connection has failed due to a certain parameter among the plurality of parameters included in the connection information (NO in S40 of FIG. 2), the mobile terminal 10 displays the error screen including a character string indicating that the process for the printer 100 to establish the AP connection has failed due to the certain parameter (S55), and displays the re-designation screen in which the first designation screen or the second designation screen is emphasized according to the error information (S60). Thereby, the user can recognize that the certain parameter should be changed when looking at the error screen or the re-designation screen. Consequently, an AP connection between the printer 100 and the AP can be appropriately established by using the mobile terminal 10.

(Correspondence Relationships)

The mobile terminal 10, the printer 100, the AP 6 (or 7) are examples of "terminal device", "communication device", "target access point", respectively. The Wi-Fi I/F 16 and the Wi-Fi I/F 116 are examples of "wireless interface" of "terminal device" and "wireless interface" of "communication device", respectively. The connection information designated in the designation screen displayed in S20 of FIG. 2 is an example of "first connection information". The WFD connection between the mobile terminal 10 and the printer 100, and the AP connection between the mobile terminal 10 and the AP 6 are examples of "first wireless connection" and "second wireless connection", respectively. The specific process is an example of "process for establishing a wireless connection with a target access point". The error information in the failure notification is an example of "information indicating the process has failed due to a specific parameter among a plurality of parameters". The error screen displayed in S55 and the re-designation screen displayed in S60 are examples of "first screen" and "second screen", respectively. The I/F re-activation instruction of S41 is an example of "instruction for disconnecting the first wireless connection". The communication of the 4way-handshake is an example of "specific communication". The scheme information 140 is an example of "specific scheme information".

In case B of FIG. 8, the SSID "ghi", the password "P3", the scheme information supported by the AP 7 (i.e., the combination of the authentication scheme "WPA2" and the encryption scheme "TKIP"), the SSID "abc", the password "P1", and the scheme information supported by the AP 6 (i.e., the combination of the authentication scheme "WPA2" and the encryption scheme "AES") are examples of "first identification information", "first password", "first scheme information", "second identification information", "second password", and "second scheme information", respectively. In case C of FIG. 9, the SSID "def", the password "P2", the SSID "abc", and the password "P1" are examples of "first identification information", "first password", "second identification information", and "second password", respectively. In case D of FIG. 10, the SSID "abc", the password "P4", and the password "P1" are examples of "first identification information", "first password", and "second password", respectively.

The process of S25, the process of S30, and the process of S40 of FIG. 2 are examples of processes executed by "acquire first connection information", "send the first connection information", "receive a failure notification" in "terminal device", respectively. The processes of S55 and S60 are an example of process executed by "display a cause screen".

The process of T12 of FIG. 5, the process of S203, the processes of S205 to S220, and the process of S250 of FIG. 4 are examples of processes executed by "establish a first wireless connection", "receive first information", "execute a process for establishing a wireless connection with the target access point", and "send a failure notification" in "communication device", respectively.

Figure 11:
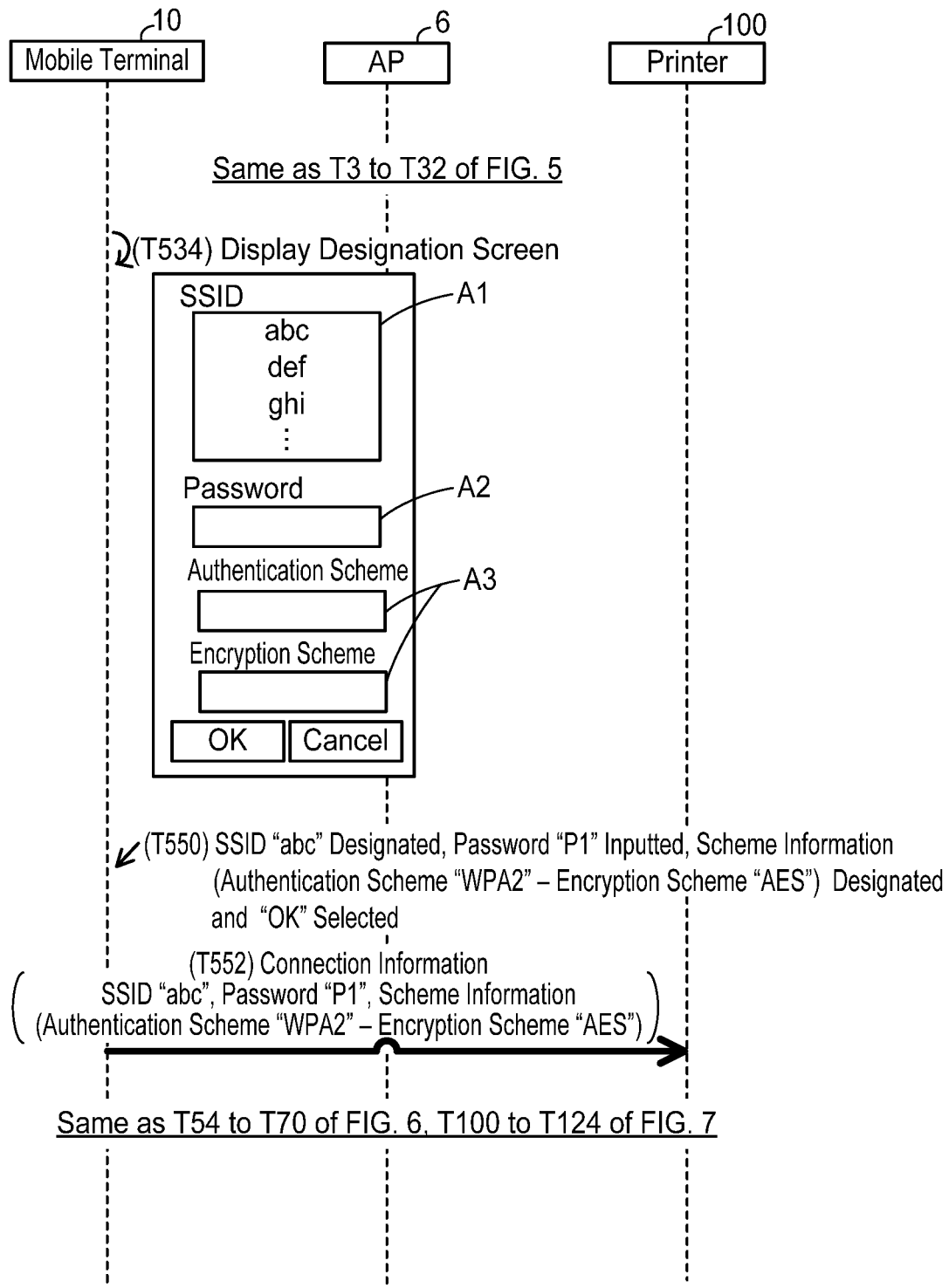
FIG. 11 shows a sequence diagram of a case E of a second embodiment.
Figure 12:
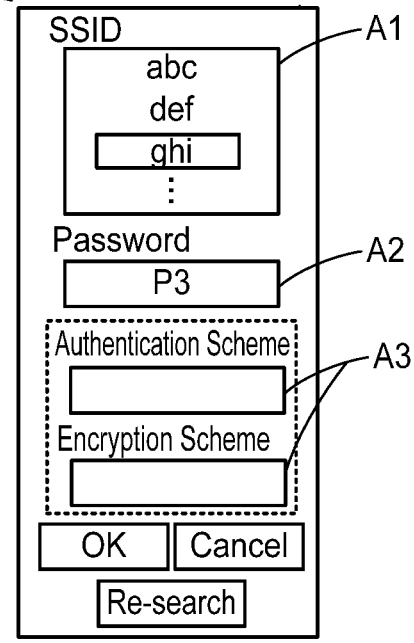
FIG. 12 shows a sequence diagram of a case F of the second embodiment.

Second Embodiment; FIG. 11 and FIG. 12

Next, a second embodiment will be described with reference to FIG. 11 and FIG. 12. The second embodiment differs from the first embodiment in that the designation screen further includes a third designation area A3 for designating scheme information.

(Case E; FIG. 11)

First, a case E, in which establishment of an AP connection succeeds, will be described with reference to FIG. 11. In the present case, processes same as T3 to T32 of FIG. 5 are firstly executed. In T534, the mobile terminal 10 (app) causes the display unit 14 to display a designation screen.

The designation screen includes the first designation area A1 for designating an SSID, the second designation area A2 for designating a password, the third designation area A3 for designating scheme information, the OK button, and the Cancel button.

In T550, the mobile terminal 10 (app) accepts in the designation screen, from the user, designation of the SSID "abc" in the first designation area A1, input of the password "P1" to the second designation area A2, designation of the authentication scheme "WPA2" and the encryption scheme "AES" in the third designation area A3, and selection of the OK button. In this case, in T552, the mobile terminal 10 (app) sends the designated connection information to the printer 100 by using the WFD connection. This connection information includes the SSID "abc", the password "P1", and the scheme information (i.e., the combination of the authentication scheme "WPA2" and the encryption scheme "AES"). Thereafter, processes same as T54 to T70 of FIG. 6 and T100 to T124 of FIG. 7 are executed, and an AP connection between the printer 100 and the AP 6 is established.

(Case F; FIG. 12)

Next, a case F, in which establishment of an AP connection fails due to scheme information, will be described with reference to FIG. 12. In the present case, the user attempts to establish an AP connection between the printer 100 and the AP 7. First, processes same as T3 to T32 of FIG. 5 and T534 of FIG. 11 are executed, and the designation screen is displayed on the mobile terminal 10 (see T534).

In the present embodiment, the user designates scheme information in the designation screen, thus scheme information different from the scheme information supported by the AP may be designated. That is, in T650, the user designates the SSID "ghi", inputs the password "P3", designates scheme information that is not supported by the AP 7 (in the present case, the combination of the authentication scheme "WPA2" and the encryption scheme "AES"), and selects the OK button in the designation screen. In this case, in T652, the mobile terminal 10 (app) sends the designated connection information to the printer 100 by using the WFD connection. This connection information includes the SSID "ghi", the password "P3", and the scheme information (i.e., the combination of the authentication scheme "WPA2" and the encryption scheme "AES").

In a case of receiving the connection information from the mobile terminal 10 in T652, the printer 100 determines whether it supports the scheme information in the connection information. In the present case, the printer 100 determines that it supports the scheme information. T654 is the same as T54 of FIG. 6 except that the SSID "ghi" is used and the communication target is the AP 7. In T656, the printer 100 receives from the AP 7 a Probe response including the scheme information supported by the AP 7 (i.e., the combination of the authentication scheme "WPA2" and the encryption scheme "TKIP"). In this case, in T657, the printer 100 determines whether it supports the scheme information in the Probe response. In the present case, the printer 100 does not support the scheme information, thus the printer 100 determines that establishment of an AP connection has failed due to the scheme information.

In response to receiving a connection confirmation from the mobile terminal 10 in T660, the printer 100 sends a failure notification including error information to the mobile terminal 10 in T662. This error information indicates that establishment of an AP connection has failed due to the scheme information.

In response to receiving the failure notification from the printer 100 in T662, the mobile terminal 10 (app) causes the display unit 14 to display an error screen in T664. This error screen is the same as the error screen of T264 of FIG. 8.

In T666, the mobile terminal 10 (app) causes the display unit 14 to display a re-designation screen. In the re-designation screen, the first designation area A1 is in a state where the SSID "ghi" designated in T650 has been already designated, the second designation area A2 is in a state where the password "P3" inputted in T650 has been already inputted, and the third designation area A3 is in a state where the scheme information designated in T650 (i.e., the combination of the authentication scheme "WPA2" and the encryption scheme "AES") has not been designated. Further, since the error information in the failure notification indicates that establishment of an AP connection has failed due to the scheme information, the third designation area A3 is emphasized in comparison with the first designation area A1 and the second designation area A2 in the re-designation screen. Thereby, the user can be informed that scheme information different from the combination of the authentication scheme "WPA2" and the encryption scheme "AES" should be designated in the re-designation screen.

(Variant 1) The process of S55 of FIG. 2 may be omitted. In this case, in the case of receiving the failure notification from the printer 100 (NO in S40), the mobile terminal 10 (app) causes the display unit 14 to display the re-designation screen in S60. In the re-designation screen, in accordance with the error information included in the failure notification, one of the first designation area and the second designation area is emphasized in comparison to the other one of the areas. Thereby, when looking at the re-designation screen, the user can recognize that the parameter corresponding to the emphasized designation area should be changed. Consequently, the AP connection between the printer 100 and the AP can be established appropriately by using the mobile terminal 10. In the present variant, "first screen" may be omitted.

(Variant 2) The process of S60 of FIG. 2 may be omitted. In this case, in the case of receiving the failure notification from the printer 100 (NO in S40), the mobile terminal 10 (app) causes the display unit 14 to display the error screen in S55 and ends the process of FIG. 2. The error screen includes a character string indicating that the process for the printer 100 to establish an AP connection has failed due to the parameter indicated by the error information. Consequently, when looking at the error screen, the user can recognize that the parameter indicated by the error information should be changed. As a result, the user can establish an AP connection between the printer 100 and the target AP by causing the mobile terminal 10 to again execute the processes of S5 to S35. Consequently, by using the mobile terminal 10, the AP connection between the printer 100 and the AP can be established appropriately. In the present variant, "second screen" and "send second connection information" may be omitted.

(Variant 3) In T266 of FIG. 8 (or T366 of FIG. 9), the mobile terminal 10 (app) may display a re-designation screen that includes the first designation area A1, the OK button, the Cancel button, and the re-search button, and does not include the second designation area A2. By this as well, the user can be informed that an SSID different from the designated SSID should be designated in the re-designation screen. Then, in a case where the user designates the SSID "abc" of the AP 6 and selects the OK button in the re-designation screen, the mobile terminal 10 (app) causes the display unit 14 to display a password designation screen including the second designation area A2. In a case where the user inputs the password "P1" to the password designation screen, the mobile terminal 10 (app) sends the designated connection information to the printer 100 by using the WFD connection (T52 of FIG. 6). Alternatively, in another variant, in T466 of FIG. 10, the mobile terminal 10 (app) may display a re-designation screen that includes the second designation area A2, the OK button, the Cancel button, and the re-search button, and does not include the first designation area A1. By this as well, the user can be informed that a new password should be designated in the re-designation screen. Then, in a case where the user inputs the password "P1" and selects the OK button in the re-designation screen, the mobile terminal 10 (app) sends the designated connection information to the printer 100 by using the WFD connection (T52 of FIG. 6).

(Variant 4) The processes of S10 to S25 of FIG. 2 may be omitted. In this case, the mobile terminal 10 (OS) establishes a WFD connection with the printer 100, for example, in a state where an AP connection with the AP 6 has been established. Thereafter, in a case of accepting a printer connection operation from the user, the mobile terminal 10 (app) acquires connection information used for the establishment of the AP connection with the AP 6 from the OS 36 and sends this connection information to the printer 100 by using the WFD connection. As a result, the printer 100 can establish an AP connection with the AP 6 by using the connection information. In the present variant, the process of acquiring the connection information from the OS 36 is an example of a process executed by "acquire first connection information".

(Variant 5) The process of S35 of FIG. 2 may be omitted. That is, the mobile terminal 10 (app) may not send the connection confirmation to the printer 100. In this case, in a case where a predetermined time has elapsed since the printer 100 determined whether the specific process (i.e., S205 to 220 of FIG. 4) succeeded or failed, the printer 100 may send the success notification or the failure notification to the mobile terminal 10 by using the WFD connection. Alternatively, in another variant, in a case where the user instructs the result of the specific process to be notified to the mobile terminal 10 after the printer 100 has determined whether the specific process had succeeded or failed, the printer 100 may send the success notification or the failure notification to the mobile terminal 10 by using the WFD connection. In the present variant, "receive a success notification" may be omitted.

(Variant 6) The processes of S43 to S45 of FIG. 2 may be omitted. In the present variant, "establish a second wireless connection" may be omitted.

(Variant 7) The process of S41 of FIG. 2 may be omitted. In the present variant, "send an instruction for disconnecting the first wireless connection" may be omitted.

(Variant 8) In S41 of FIG. 2, instead of the I/F re-activation instruction, the mobile terminal 10 (app) may send to the printer 100 a disconnection instruction instructing disconnection of the WFD connection. In this case, in response to receiving the disconnection instruction from the mobile terminal 10, the printer 100 disconnects the WFD connection with the mobile terminal 10. In the present variant as well, the printer 100 shifts to a state where only the AP connection is established from a state where both the AP connection and the WFD connection are established simultaneously. Consequently, the processing load on the printer 100 can be reduced. In the present variant, the disconnection instruction is an example of "instruction for disconnecting a first wireless connection".

(Variant 9) The mobile terminal 10 and the printer 100 may support a Soft AP scheme instead of the WFD scheme. In this case, for example, in S30 of FIG. 2, the mobile terminal 10 may send the connection information to the printer 100 by using a wireless connection in accordance with the Soft AP scheme, instead of using the WFD connection. In the present variant, the wireless connection in accordance with the Soft AP scheme is an example of "first wireless connection". Alternatively, in another variant, each of the mobile terminal 10 and the printer 100 may further comprise a wireless interface in accordance with a Bluetooth (registered trademark) scheme (simply referred to as "BT scheme" below). In this case, for example, in S30 of FIG. 2, the mobile terminal 10 may send the connection information to the printer 100 by using a wireless connection in accordance with the BT scheme, instead of using the WFD connection. In the present variant, the wireless connection in accordance with the BT scheme is an example of "first wireless connection". Further, the Wi-Fi I/F 16 and the wireless interface according to the BT scheme of the mobile terminal 10 are an example of "wireless interface" of "terminal device", and the Wi-Fi I/F 116 and the wireless interface according to the BT scheme of the printer 100 are an example of "wireless interface" of "communication device".

(Variant 10) "Communication device" is not limited to the printer 100, and may be, for example, a scanner, a multi-function device, a sewing machine, a camera, or the like. In general, "communication device" may be any device so long as it is capable of executing wireless communication.

(Variant 11) In each of the above embodiments, the processes of FIG. 2 to FIG. 12 are realized by software (i.e., the OS 36, the app 38, the program 136). However, at least one of these processes may be realized by hardware such as a logic circuit.

What is claimed is:

1. A non-transitory computer-readable recording medium storing computer-readable instructions for a terminal device, wherein the computer-readable instructions, when executed by a processor of the terminal device, cause the terminal device to:
acquire first connection information including a plurality of parameters for establishing a wireless connection with a target access point;
after a first wireless connection with a communication device has been established via a wireless interface of the terminal device, send the first connection information to the communication device by using the first wireless connection and not via an access point, the first connection information being used in the communication device to execute a process for establishing a wireless connection with the target access point by using the plurality of parameters included in the first connection information;
in a case where the process in the communication device has failed, receive a failure notification indicating that the process has failed from the communication device by using the first wireless connection and not via an access point, the failure notification including information indicating that the process has failed due to a specific parameter among the plurality of parameters;
in a case where the failure notification is received from the communication device, display a cause screen indicating that the process has failed due to the specific parameter on a display unit of the terminal device;
in a case where the process has succeeded in the communication device, receive a success notification indicating that the process has succeeded from the communication device by using the first wireless connection and not via an access point; and in a case where the success notification is received from the communication device, send an instruction for disconnecting the first wireless connection to the communication device by using the first wireless connection and not via an access point.

2. The non-transitory computer-readable recording medium as in claim 1, wherein
the cause screen includes a first screen that includes a character string indicating that the process has failed due to the specific parameter.

3. The non-transitory computer-readable recording medium as in claim 1, wherein
the cause screen includes a second screen for designating a new parameter instead of the specific parameter,
the computer-readable instructions, when executed by the processor, further cause the terminal device to:
in a case where the new parameter is designated on the second screen, send second connection information including the new parameter to the communication device by using the first wireless connection and not via an access point.

4. The non-transitory computer-readable recording medium as in claim 3, wherein
the first connection information includes first identification information for identifying the target access point and a first password,
in a case where the failure notification indicating that the process has failed due to the first password, which is the specific parameter is received from the communication device, the second screen is displayed on the display unit, the second screen including a first designation area for designating the first identification information and a second designation area for designating a second password different from the first password,
the second designation area is emphasized as compared to the first designation area, and
in a case where the first identification information and the second password are designated on the second screen, the second connection information including the first identification information and the second password is sent to the communication device by using the first wireless connection and not via an access point.

5. The non-transitory computer-readable recording medium as in claim 4, wherein
when the second screen is displayed on the display unit, the first designation area is in a state where the first identification information has been designated and the second designation area is in a state where the first password is not designated.

6. The non-transitory computer-readable recording medium as in claim 3, wherein
the first connection information includes first identification information for identifying the target access point and a first password,
in a case where the failure notification indicating that the process has failed due to the first identification information, which is the specific parameter, is received from the communication device, the second screen is displayed on the display unit, the second screen including a first designation area for designating second identification information different from the first identification information and a second designation area for designating a second password different from the first password,
the first designation area is emphasized as compared to the second designation area, and
in a case where the second identification information and the second password are designated on the second screen, the second connection information including the second identification information and the second password is sent to the communication device by using the first wireless connection and not via an access point.

7. The non-transitory computer-readable recording medium as in claim 6, wherein
the first designation area is in a state where the first identification information is incapable of being designated.

8. The non-transitory computer-readable recording medium as in claim 3, wherein
the first connection information includes first identification information for identifying the target access point, a first password, and first scheme information that is a combination of a first authentication scheme and a first encryption scheme,
in a case where the failure notification indicating that the process has failed due to the first scheme information, which is the specific parameter, is received from the communication device, the second screen is displayed on the display unit, the second screen including a first designation area for designating second identification information different from the first identification information and a second designation area for designating a second password different from the first password,
the first designation area is emphasized as compared to the second designation area,
in a case where the second identification information and the second password are designated on the second screen, the second connection information is sent to the communication device by using the first wireless connection and not via an access point,
the second connection information includes the second identification information, the second password, and second scheme information different from the first scheme information, and
the second scheme information is a combination of a second authentication scheme and a second encryption scheme.

9. The non-transitory computer-readable recording medium as in claim 1, wherein
the computer-readable instructions, when executed by the processor, further cause the terminal device to:
in a case where the process has succeeded in the communication device, receive a success notification indicating that the process has succeeded from the communication device by using the first wireless connection not via an access point; and
in a case where the success notification is received from the communication device, establish a second wireless connection with the target access point via the wireless interface to participate in a wireless network formed by the target access point as a child station.

10. The non-transitory computer-readable recording medium as in claim 9, wherein
the communication device is a printer capable of executing printing,
the computer-readable instructions, when executed by the processor, further cause the terminal device to:
in a case where the second wireless connection is established with the target access point and a printing operation for causing the communication device which is the printer to execute the printing is accepted, send print data representing an image to be printed to the communication device by using the second wireless connection and via the target access point.

11. The non-transitory computer-readable recording medium as in claim 1, wherein
the instruction is for disconnecting the first wireless connection by stopping energization to a wireless interface of the communication device.

12. A terminal device comprising:
a wireless interface;
a processor; and
a memory storing computer-readable instructions therein, the computer-readable instructions, when executed by the processor, causing the terminal device to:
acquire first connection information including a plurality of parameters for establishing a wireless connection with a target access point;
after a first wireless connection via the wireless interface has been established with a communication device, send the first connection information to the communication device by using the first wireless connection and not via an access point, the first connection information being used in the communication device to execute a process for establishing a wireless connection with the target access point by using the plurality of parameters included in the first connection information;
in a case where the process in the communication device has failed, receive a failure notification indicating that the process has failed from the communication device by using the first wireless connection and not via an access point, the failure notification including information indicating that the process has failed due to a specific parameter among the plurality of parameters;
in a case where the failure notification is received from the communication device, display a cause screen indicating that the process has failed due to the specific parameter on a display unit of the terminal device;
in a case where the process has succeeded in the communication device, receive a success notification indicating that the process has succeeded from the communication device by using the first wireless connection and not via an access point; and
in a case where the success notification is received from the communication device, send an instruction for disconnecting the first wireless connection to the communication device by using the first wireless connection and not via an access point.

13. A communication device comprising:
a wireless interface;
a processor; and
a memory storing computer-readable instructions therein, the computer-readable instructions, when executed by the processor, causing the communication device to:
establish a first wireless connection with a terminal device via the wireless interface;
after the first wireless connection has been established with the terminal device, receive first connection information from the terminal device by using the first wireless connection and not via an access point, the first connection information including a plurality of parameters for establishing a wireless connection with a target access point;
in a case where the first connection information is received from the terminal device, execute a process for establishing a wireless connection with the target access point by using the plurality of parameters included in the first connection information;
in a case where the process has failed, send a failure notification indicating that the process has failed to the terminal device by using the first wireless connection and not via an access point, the failure notification including information indicating that the process has failed due to a specific parameter among the plurality of parameters, wherein a cause screen indicating that the process has failed due to the specific parameter is displayed on the terminal device in a case where the terminal device receives the failure notification;
in a case where the process has succeeded, send a success notification indicating that the process has succeeded to the terminal device by using the first wireless connection and not via an access point; and
in a case where the success notification has been sent to the terminal device, receive an instruction for disconnecting the first wireless connection from the terminal device by using the first wireless connection and not via an access point.

14. The communication device as in claim 13, wherein
the first connection information includes a first password,
the process includes a specific communication via the wireless interface in which the first password included in the first connection information is used, and
in a case where the process has failed due to the specific communication, the failure notification indicating that the process has failed due to the first password, which is the specific parameter, is sent to the terminal device by using the first wireless connection and not via an access point.

15. The communication device as in claim 13, wherein
the first connection information includes first identification information for identifying the target access point,
the process includes sending a Probe request signal including the first identification information included in the first connection information via the wireless interface, and
in a case where the process has failed due to a Probe response signal for the Probe request signal being not received, the failure notification indicating that the process has failed due to the first identification information, which is the specific parameter, is sent to the terminal device by using the first wireless connection and not via an access point.

16. The communication device as in claim 13, wherein
the memory stores specific scheme information supported by the communication device, the specific scheme information being a combination of a specific authentication scheme and a specific encryption scheme,
the first connection information includes first scheme information that is a combination of a first authentication scheme and a first encryption scheme,
the process includes determining whether the specific scheme information stored in the memory matches the first scheme information included in the first connection information, and
in a case where the process has failed due to a determination that the specific scheme information and the first scheme information do not match, the failure notification indicating that the process has failed due to the first scheme information, which is the specific parameter, is sent to the terminal device by using the first wireless connection and not via an access point.

* * * * *